United States Patent
Urata

(10) Patent No.: US 9,757,797 B2
(45) Date of Patent: Sep. 12, 2017

(54) SLIDER FOR LINEAR CONVEYER AND LINEAR CONVEYER

(71) Applicant: YAMAHA HATSUDOKI KABUSHIKI KAISHA, Shizuoka (JP)

(72) Inventor: Satoshi Urata, Iwata (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 400 days.

(21) Appl. No.: 14/467,608

(22) Filed: Aug. 25, 2014

(65) Prior Publication Data

US 2015/0061414 A1    Mar. 5, 2015

(30) Foreign Application Priority Data

Aug. 30, 2013 (JP) .................. 2013-180218
Aug. 30, 2013 (JP) .................. 2013-180246

(51) Int. Cl.
*H02K 41/03* (2006.01)
*H02K 11/00* (2016.01)
(Continued)

(52) U.S. Cl.
CPC ......... *B22D 39/006* (2013.01); *G01D 5/2451* (2013.01); *H02K 41/031* (2013.01);
(Continued)

(58) Field of Classification Search
CPC ............... H02K 41/031; H02K 11/001; H02K 11/0015; H02K 11/21; H02K 11/215; H02K 11/22; H02K 11/225; H02K 11/23
(Continued)

(56) References Cited

U.S. PATENT DOCUMENTS 4,158,509 A    6/1979  Rieder et al.
5,589,722 A *  12/1996 Sakaguchi ............... H02K 3/26
                                                310/156.06
(Continued)

FOREIGN PATENT DOCUMENTS

CN    1930765 A       3/2007
DE    4424649 A1 *    1/1996    ........... G01B 5/0014
(Continued)

OTHER PUBLICATIONS

Jung (DE 4424649 A1) English Translation.*
(Continued)

*Primary Examiner* — Quyen Leung
*Assistant Examiner* — Robert E Mates
(74) *Attorney, Agent, or Firm* — Studebaker & Brackett PC

(57) ABSTRACT

A linear conveyer includes a stationary module and a slider. The stationary module includes a frame extending linearly, a stator including armature coils and fixed to the frame, a rail, and a magnetic sensor. The slider movable along the rail with a driving linear motor includes magnetic poles, a rail guide fitted on the rail, and a magnetic scale. The magnetic scale includes a plastic magnet having magnetic poles and extending along an extending direction in which the rail extends, and a back yoke where the plastic magnet is placed. A position of the slider is detected by the magnetic sensor and the magnetic scale. The plastic magnet has a fixed portion that is fixed with respect to the back yoke and a portion other than the fixed portion, the portion being movable relative to the back yoke along an extending direction in which the magnetic scale extends.

17 Claims, 19 Drawing Sheets

(51) Int. Cl.
*B22D 39/00* (2006.01)
*G01D 5/245* (2006.01)
*H02K 11/21* (2016.01)
*H02K 11/215* (2016.01)
*H02K 7/08* (2006.01)

(52) U.S. Cl.
CPC ............... *H02K 7/08* (2013.01); *H02K 11/21* (2016.01); *H02K 11/215* (2016.01)

(58) Field of Classification Search
USPC .......... 310/68 B, 12.01, 12.09, 12.19, 12.11, 310/12.27
See application file for complete search history.

(56) References Cited

U.S. PATENT DOCUMENTS

| | | | | |
|---|---|---|---|---|
| 5,711,084 | A * | 1/1998 | Spanner | G01D 5/34707 33/702 |
| 6,876,105 | B1 * | 4/2005 | Faizullabhoy | H02K 41/03 310/12.19 |
| 2007/0170786 | A1 | 7/2007 | Miyamoto et al. | |
| 2010/0296906 | A1 * | 11/2010 | Hanamura | H02K 41/031 414/737 |
| 2014/0320058 | A1 * | 10/2014 | Takagi | H02K 41/031 318/632 |

FOREIGN PATENT DOCUMENTS

| | | | | |
|---|---|---|---|---|
| FR | 2362364 | A1 | 3/1978 | |
| GB | 2242747 | A | 10/1991 | |
| JP | 2004056864 | A * | 2/2004 | |
| JP | 2010-115020 | A | 5/2010 | |
| JP | 2013-099208 | A | 5/2013 | |
| JP | 2013-102562 | A | 5/2013 | |
| JP | 2013-102570 | A | 5/2013 | |
| JP | WO 2013069201 | A1 * | 5/2013 | ........... H02K 41/031 |
| SU | 1553824 | A1 | 3/1990 | |

OTHER PUBLICATIONS

Yamazaki (JP 2004056864 A) English Translation.*
An Office Action issued by the Chinese Patent Office dated Jun. 3, 2016, which corresponds to Chinese Patent Application No. 201410432158.6 and is related to U.S. Appl. No. 14/467,608; with English language translation.
An Office Action issued by the Chinese Patent Office dated Jun. 3, 2016, which corresponds to Chinese Patent Application No. 201410432158.6 and is related to U.S. Appl. No. 14/467,608.
The extended European search report issued by the European Patent Office dated Oct. 14, 2015, which corresponds to European Patent Application No. 14002952.1-1809 and is related to U.S. Appl. No. 14/467,608.
The Second Office Action issued by the Chinese Patent Office dated Nov. 28, 2016, which corresponds to Chinese atent Application No. 201410432158.6 and is related to U.S. Appl. No. 14/467,608; with English anguage translation.

* cited by examiner

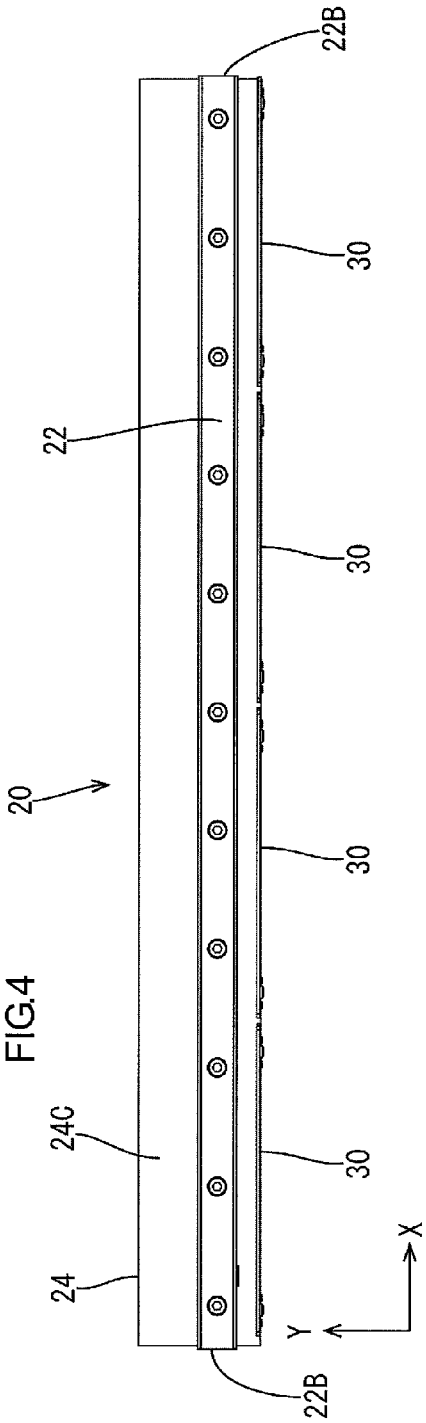
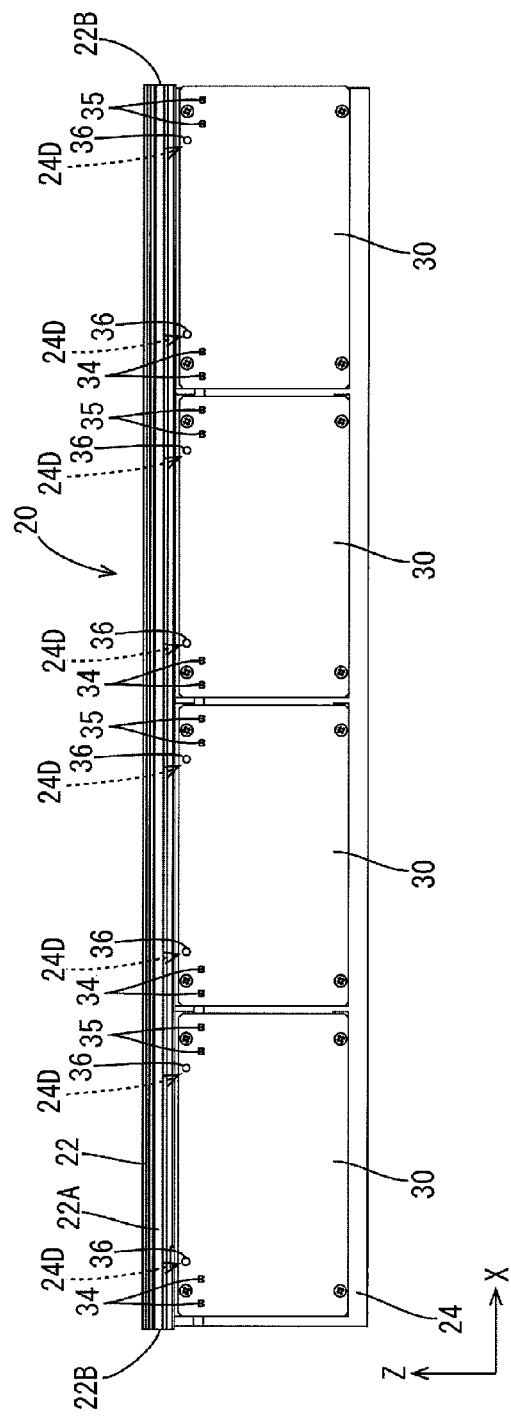

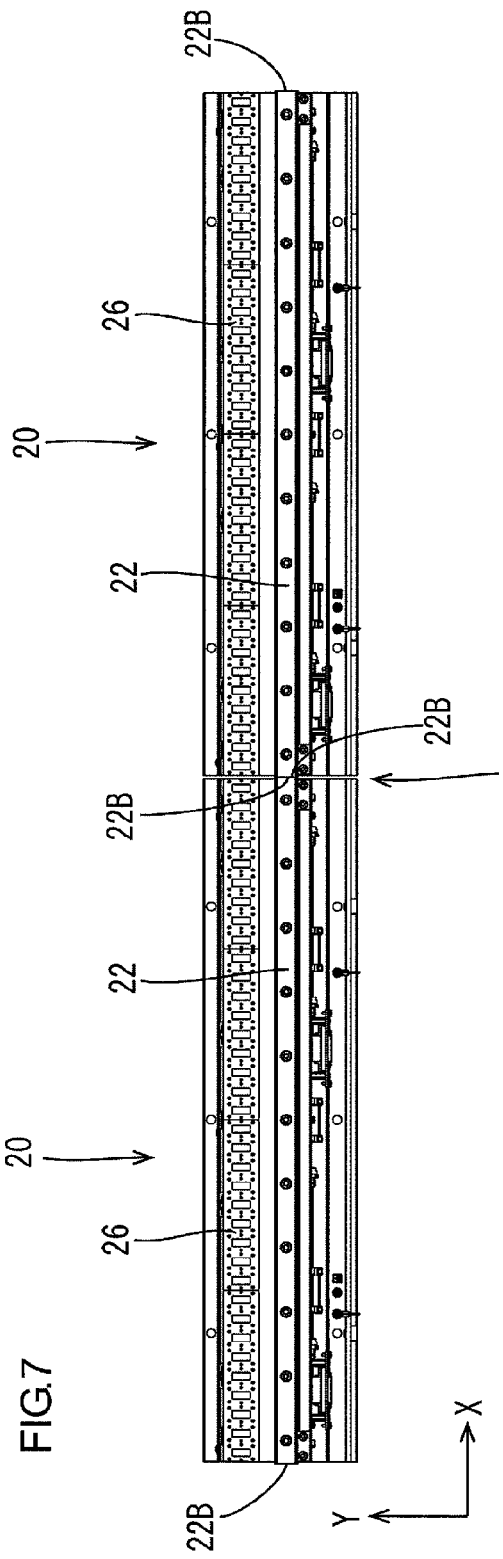

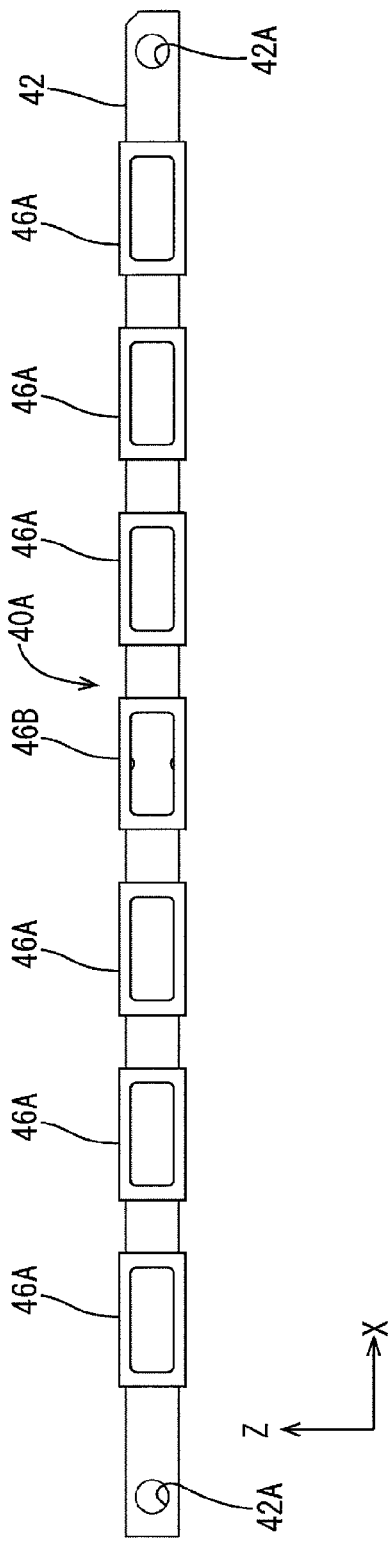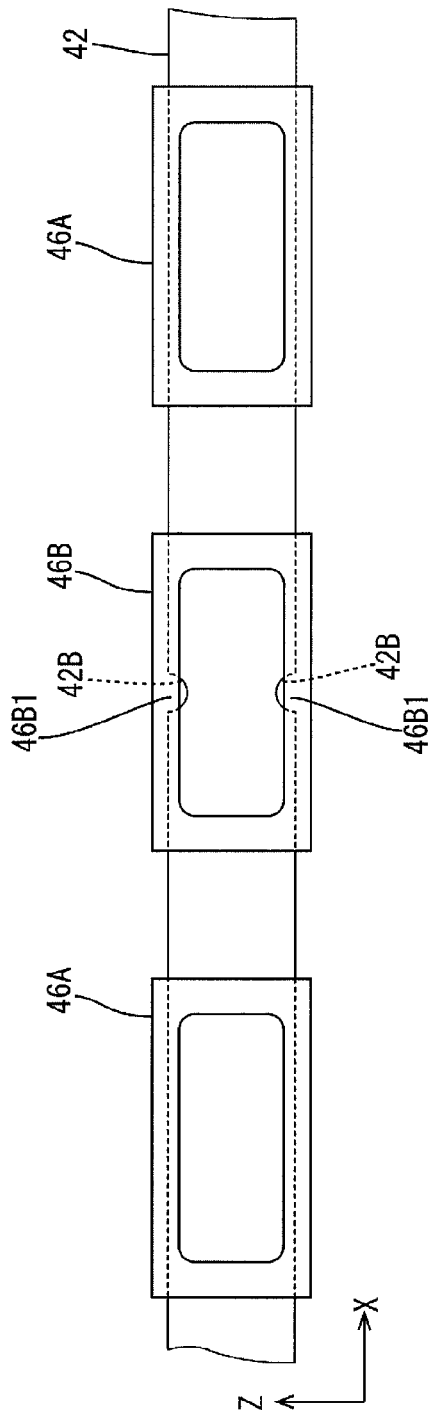

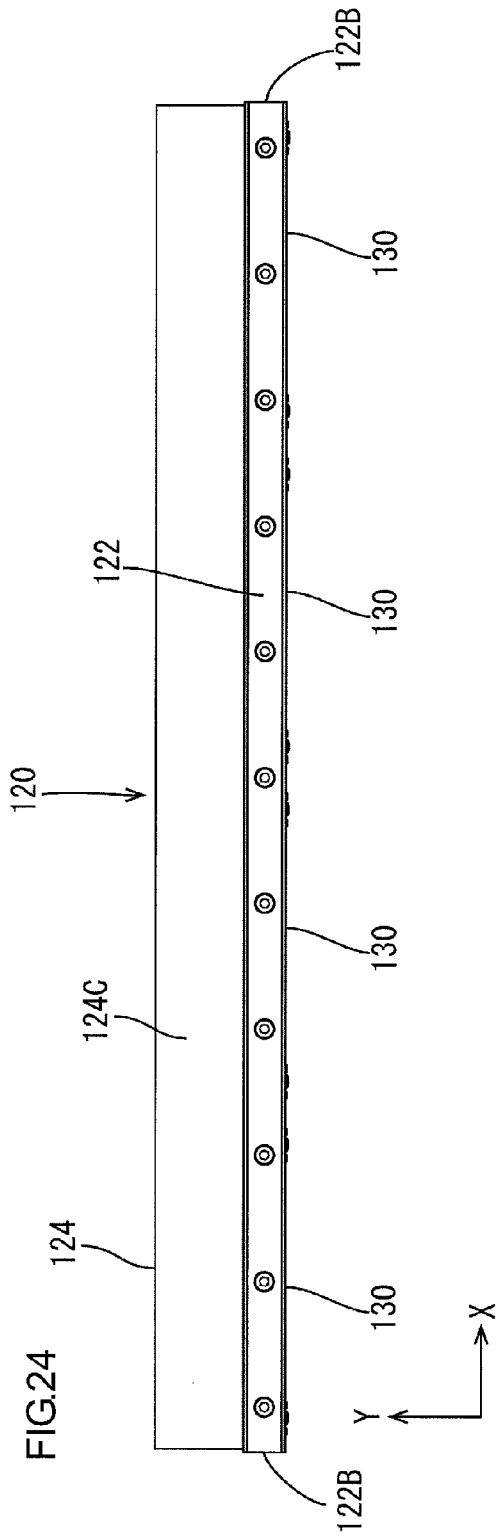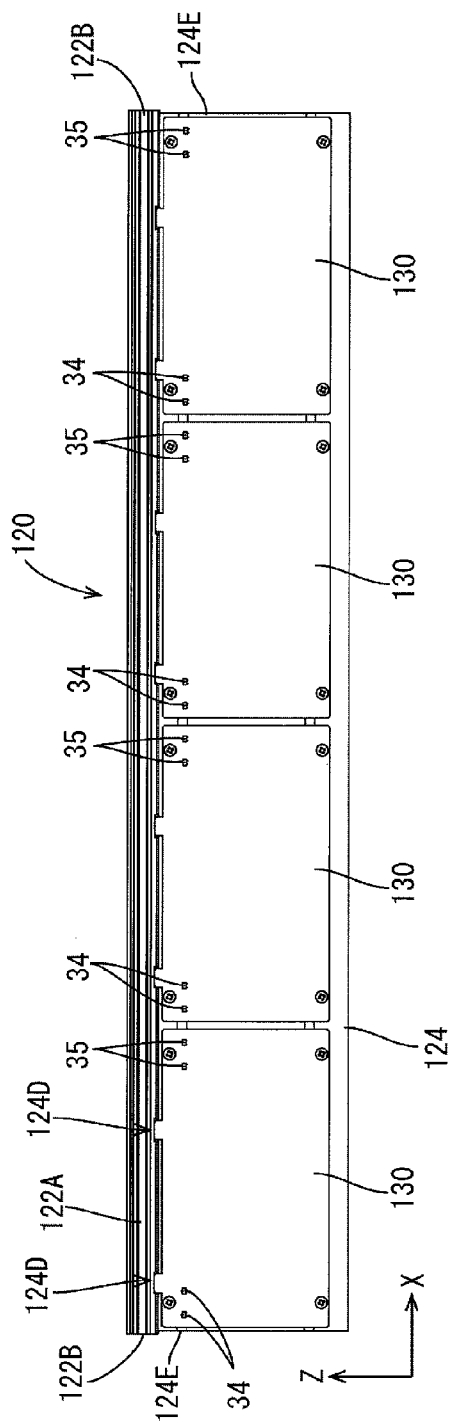

SLIDER FOR LINEAR CONVEYER AND LINEAR CONVEYER

CROSS REFERENCE TO RELATED APPLICATION

This application claims benefit of priority to Japanese Patent Application No. 2013-180246 filed Aug. 30, 2013, and to Japanese Patent Application No. 2013-180218 filed Aug. 30, 2013, the entire content of each of which is incorporated herein by reference.

TECHNICAL FIELD

The present disclosure relates to a slider for a linear conveyer and a linear conveyer.

BACKGROUND

A linear conveyer including a slider that moves along a rail has been used. The slider is a platform car that conveys parts. Such a linear conveyer includes, for example, a unit-type stationary module and the slider. The stationary module includes a rail that extends linearly and a stator including armature coils and is fixed to the rail. The slider includes a rail guide that is fitted on the rail and a mover that faces the stator when the rail guide is fitted to the rail, and the mover includes powerful permanent magnets to generate magnetic poles.

Such a linear conveyer includes a linear scale that detects a position of the slider that moves along the rail. The linear scale includes a scale that is provided on the slider and a sensor that is provided on the stationary module. For example, a linear conveyer including a magnetic linear scale has been known. Such a magnetic linear scale includes a magnetic scale having magnets that is provided on the slider and a magnetic sensor that is provided on the module, and the magnetic linear scale detects a position of the slider according to magnetic flux from the magnetic scale.

The magnetic scale includes a back yoke and a plurality of neodymium magnets that are mounted on a surface of the back yoke. The neodymium magnets are bonded to the back yoke, for example. In such a magnetic scale, the neodymium magnet is used as the magnet. However, it is effective to use a plastic magnet as the magnet to reduce the weight of the scale and the slider.

SUMMARY

An objective of the present technology is to provide a slider for a linear conveyer and a linear conveyer that reduces a weight of a slider and where errors in detecting positions of sliders are less likely to be caused.

The present technology relates to a linear conveyer including a stationary module and a slider. The stationary module includes a frame extending linearly, a stator including armature coils and is fixed to the frame, a rail fixed to the frame, and a magnetic sensor. The slider movable along the rail with a driving linear motor includes a mover including magnetic poles, a rail guide fitted on the rail, and a magnetic scale. The magnetic scale includes a plastic magnet having magnetic poles and extending along an extending direction in which the rail extends, and a back yoke on which the plastic magnet is placed. A position of the slider is detected by the magnetic sensor and the magnetic scale, and the plastic magnet has a fixed portion that is fixed with respect to the back yoke and a portion other than the fixed portion, the portion being movable relative to the back yoke along an extending direction in which the magnetic scale extends.

BRIEF DESCRIPTION OF THE DRAWINGS

FIG. 4 is an upper view of the stationary module from which a plate member is detached.
FIG. 5 is a front view of the stationary module from which the plate member is detached.
FIG. 7 is an upper view of two connected stationary modules.
FIG. 8 is a front view of the two connected stationary modules.
FIG. 18 is rear side view of the magnetic scale.
FIG. 19 is an enlarged rear side view illustrating the vicinity of a fixed portion in FIG. 12.
FIG. 24 is an upper view illustrating a stationary module from which a plate member is detached according to a second embodiment.
FIG. 25 is a front view illustrating the stationary module from which a plate member is detached according to a second embodiment.

DETAILED DESCRIPTION

In the linear conveyer including a magnetic linear scale, the slider may be detached from the module for maintenance or storage of the slider and the detached slider may be transported and stored in a warehouse having an environmental temperature that is different from that in the place where the linear conveyer works. A magnetic scale of the slider that is stored in the warehouse may be expanded by thermal expansion due the change in the environmental temperature. In such a case, if the magnet used for the magnetic scale is a plastic magnet, a difference in the linear expansion coefficients becomes great between the plastic magnet and the back yoke. Therefore, if the magnetic scale that is expanded in a high temperature environment is moved back to the normal temperature environment, the magnetic scale may be warped or a position gap may be caused between the back yoke and the plastic magnet. If such warping or position gap is caused, a detection position gap may be caused between the sliders and this may increase a range of error in detecting positions of the sliders.

First Embodiment (Overall Configuration of Linear Conveyer)

A first embodiment of the present technology will be described with reference to the drawings. In this embodiment, a linear conveyer 1 that is driven by a linear motor will be described. X-axes, Y-axes, and Z-axes are in some drawings. Directions indicated by the axes in each drawing correspond to directions indicated by the respective axes in other drawings. An X-axis direction corresponds to a moving direction of the linear conveyer 1 and a Z-axis direction corresponds to a vertical direction.

Figure 1:
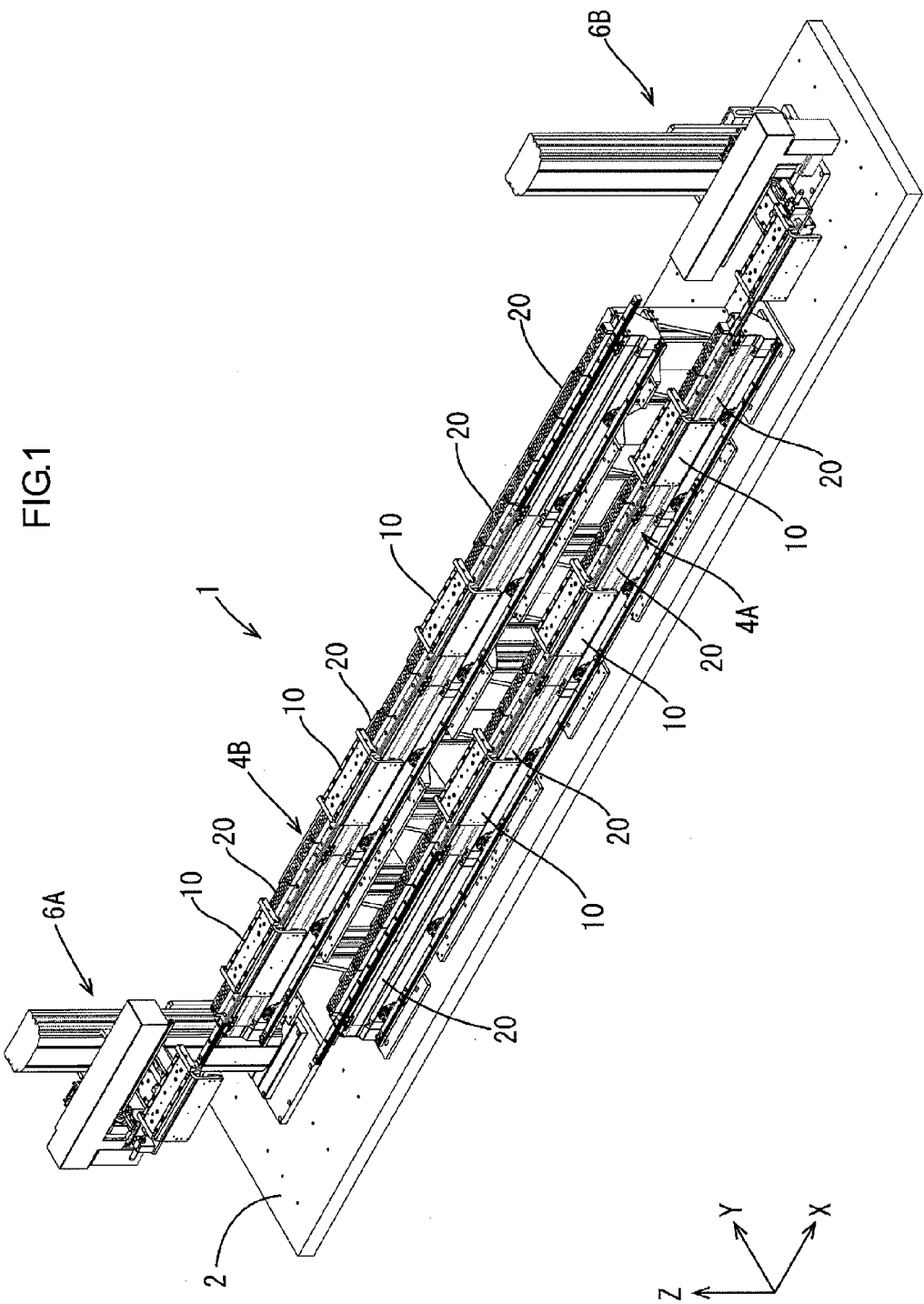
FIG. 1 is a perspective view illustrating a linear conveyer.

As illustrated in FIG. 1, the linear conveyer 1 is arranged on a base 2 and includes two linear conveyance units 4A, 4B that extend in the X-axis direction and arranged at two levels including an upper level and a lower level, respectively. A plurality of sliders 10 are mounted on each of the linear conveyance units 4A, 4B and move in the X-axis direction. Slider lift-up and lowering devices 6A, 6B are arranged at two end sides of each linear conveyance unit 4A, 4B, respectively.

The two linear conveyance units 4A, 4B have a same length and are arranged to overlap each other with respect to a vertical direction. When the slider 10 moves along one of the linear conveyance units 4A (4B) and reaches one end of the linear conveyance unit 4A, the slider 10 is moved and placed on the slider lift-up and lowering device 6A (6B) and lifted up (lowered) to one end of another one of the linear conveyance units 4B (4A). The slider 10 reverses its moving direction and moves along another one of the linear conveyance units 4B (4A). The linear conveyer 1 includes a looped conveyance path of the slider 10 including the two conveyance units 4A, 4B and the two slider lift-up and lowering devices 6A, 6B.

In the linear conveyer 1 with such a configuration, the slider 10 stops at a certain work position on the conveyance path and a part is attached to a work on the slider 10, or screws are tightened, or sealing may be performed.

(Configuration of Stationary Module)

Figure 2:
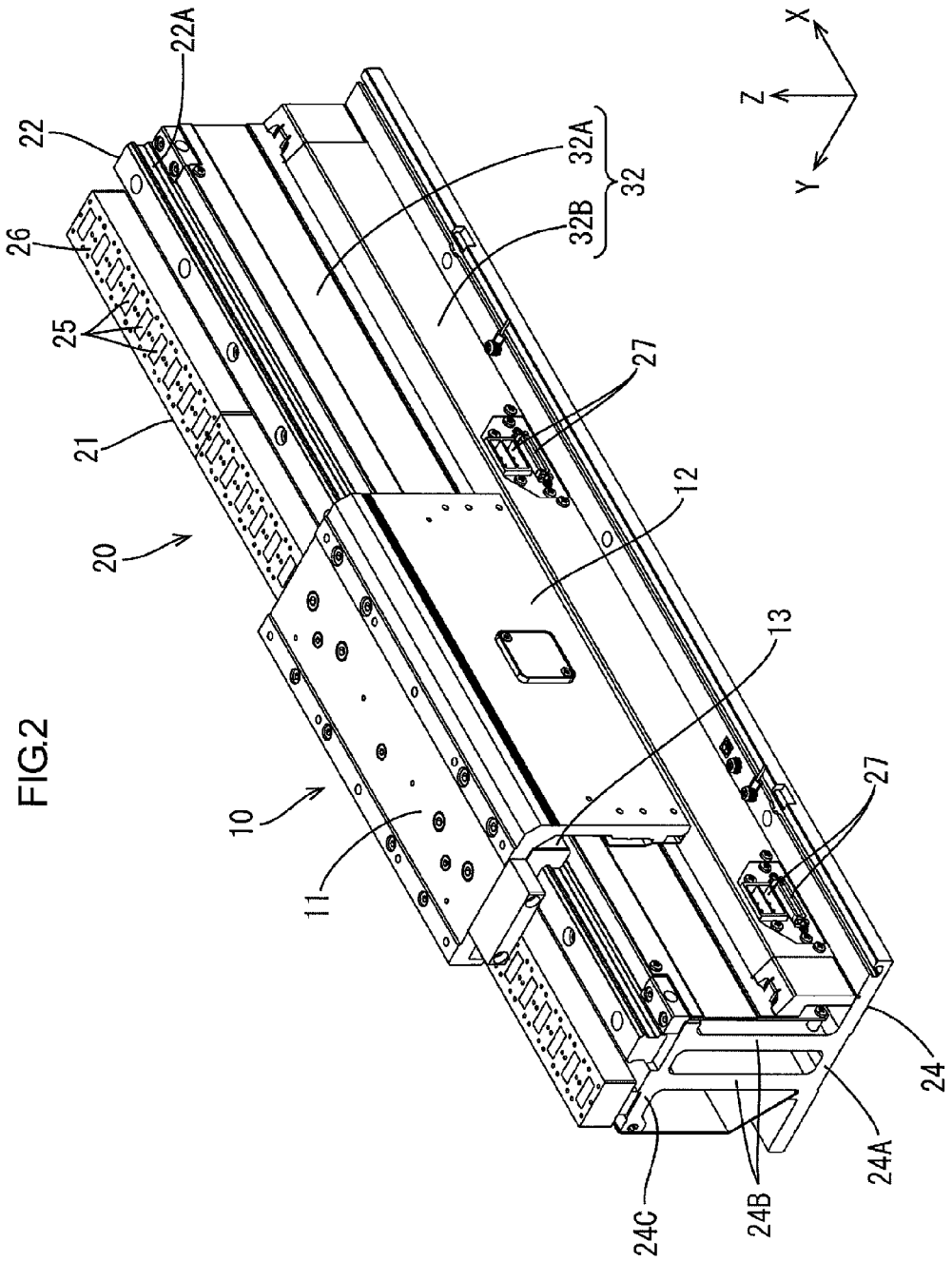
FIG. 2 is a perspective view illustrating a stationary module to which a slider is mounted.

Each linear conveyance unit 4A, 4B includes four stationary modules 20 that are connected to each other along a moving direction of the slider 10. As illustrated in FIG. 2, each of the stationary modules 20 includes a rail 22 that extends in the moving direction in which the slider 10 moves (the X-axis direction), a frame 24, and a stator 26 of a linear motor.

Figure 3:
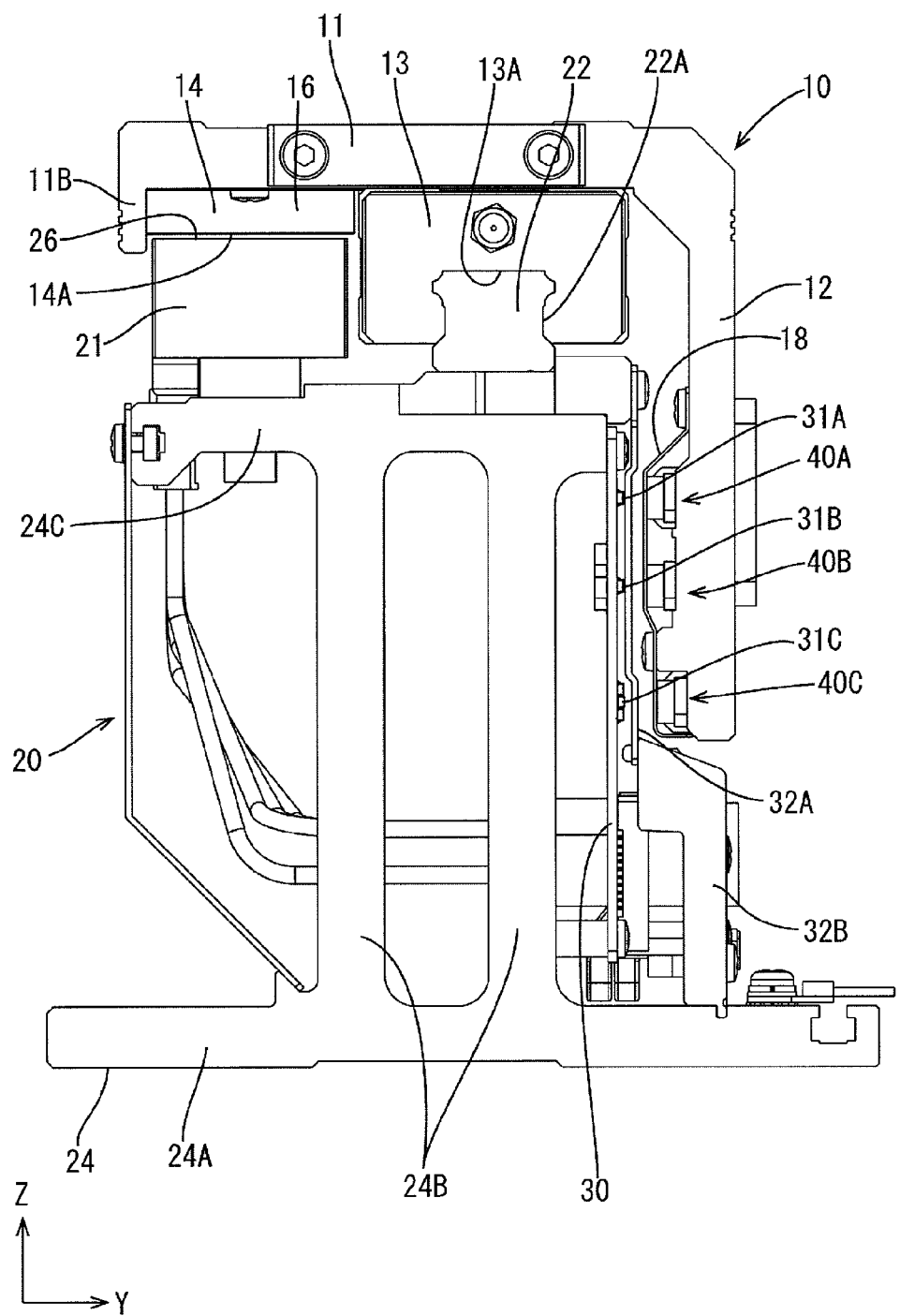
FIG. 3 is a side view illustrating the stationary module to which the slider is mounted.

As illustrated in FIGS. 2 and 3, the frame 24 is obtained by cutting an extrusion molded object made of aluminum alloy into several pieces each having a certain length, and the frame 24 has an elongated base seat shape that extends in a right and left direction along the moving direction in which the slider 10 moves. The frame 24 includes a mount portion 24A, support portions 24B, and a rail fixing portion 24C. The mount portion 24A is arranged on the base 2. The support portions 24B rise upward from a middle portion of the mount portion 24A with respect to a width direction of the frame 24 (the Y-axis direction). The rail fixing portion 24C is provided on upper ends of the support portions 24B. The mount portion 24A is a flat plate that is parallel to a plate surface of the base 2 so as to be arranged on the base 2. The support portions 24B rise substantially vertically from the mount portion 24A and are two flat plate members whose plate surfaces face toward the width direction of the frame 24 (the Y-axis direction). The rail fixing portion 24C is a plate having a width (a Y-axis dimension) smaller than the mount portion 24A and that is arranged to be parallel to the mount portion 24A.

The rail 22 extending in the elongated direction of the frame 24 and the stator 26 are arranged on the rail fixing portion 24C so as to be adjacent to each other with respect to the width direction (the Y-axis direction) of the frame 24. An extending length (a dimension in the moving direction of the slider) of the rail 22 and the stator 26 is equal to each other. The rail 22 and the stator 26 are firmly fixed to the rail fixing portion 24C and accordingly, a position relationship between the rail 22 and the stator 26 with respect to the frame 24 is maintained to be accurate.

The rail 22 has an elongated substantially rectangular columnar shape having rectangular end surfaces. The rail 22 has recesses 22A on its respective two long side surfaces. Projections formed on an inner surface of a guide groove 13A of a rail guide 13 included in the slider 10 are fitted to the recesses 22A. The rail guide 13 and the guide groove 13A will be described later. The rail 22 is fitted to the guide groove 13A of the rail guide 13 of the slider 10 that is arranged on the rail 22 so that the rail 22 functions as a guide member that guides the slider 10 along the rail 22 and the stator 26.

The stator 26 has an elongated substantially rectangular columnar shape having rectangular end surfaces like the rail 22. A plurality of armature coils 25 are fixed to the stator 26 to be embedded therein and arranged along the elongated direction of the stator 26. In the linear conveyer 1, a current supplied to the armature coils 25 is controlled and accordingly, the slider 10 mounted to the stationary module 20 moves along the rail 22 and the stator 26 by the driving linear motor.

As illustrated in FIGS. 4 and 5, four sensor boards 30 are arranged on a long-side surface of the stationary module 20 to cover an outer side surface of the support portion 24B that is closer to the rail 22. The sensor boards 30 are arranged in the moving direction of the slider 10 and fixed to the support portion 24B such that the plate surfaces thereof face toward the width direction. The sensor boards 30 constitute a linear scale that detects a position of the slider 10 in cooperation with magnetic scales 40A, 40B, 40C included in the slider 10 that will be described later. FIGS. 4 and 5 illustrate the stationary module 20 from which the stator 26 and a plate member 32 that will be described later are detached.

As illustrated in FIG. 3, each of the sensor boards 30 includes three magnetic sensor groups 31A, 31B, 31C that are arranged at certain intervals in the vertical direction. The magnetic sensor groups 31A, 31B, 31C include Hall elements or MR elements that can detect the magnetic scales 40A, 40B, 40C that will be described later. The magnetic sensor groups 31A, 31B, 31C are arranged on each sensor board 30 with same arrangement positions. The magnetic sensor groups 31A, 31B, 31C are arranged on the sensor board 30 so as to correspond to the magnetic scales 40A, 40B, 40C, respectively, when the slider 10 is mounted to the stationary module 20.

Among the magnetic sensor groups 31A, 31B, 31C, the uppermost magnetic sensor group 31A (hereinafter referred to as a detection sensor group 31A) is used as the sensor for detecting the position of the slider 10. When the detection sensor group 31A detects the opposing magnetic scale 40A of the slider 10, a certain signal for detecting the position of the slider is output from the sensor board 30.

Figure 6:
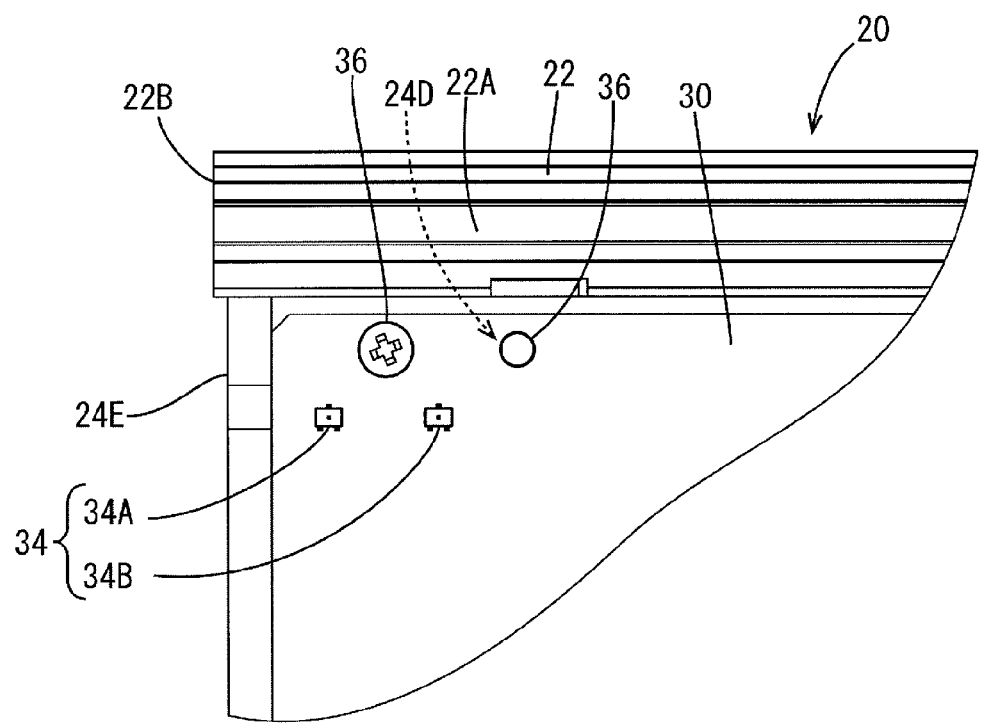
FIG. 6 is an enlarged front view of one end portion of a rail in FIG. 5.

The detection sensor group 31A includes a first detector 34 and a second detector 35. As illustrated in FIG. 5, the first detector 34 and the second detector 35 are arranged in each of end side portions of the sensor board 30 in the moving direction of the slider 10. In FIG. 5, the detection sensor groups 31B, 31C mounted on each sensor board 30 are not illustrated. As illustrated in FIG. 6, the first detector 34 includes two readers 34A, 34B that are arranged along the moving direction of the slider 10, and the second detector 35 includes two readers 35A, 35B. In the detection sensor group 31A, the magnetic flux from the magnetic scale 40A of the slider 10 is read by the readers 34A, 34B of the first detector 34 and the readers 35A, 35B of the second detector 35 to detect accurate position of the slider 10.

As illustrated in FIGS. 2 and 3, while the linear conveyer 1 is working, a plate member 32 is arranged on a side of the long side surface of the stationary module 20 and extends in the elongated direction of the support portion 24B to cover an outer side surface of the support portion 24B that is closer to the rail 22 and covers the sensor boards 30. The plate member 32 rises from the mount portion 24A and each end of the plate member 32 is fixed to the mount portion 24A and the support portion 24B. The plate member 32 includes a first plate portion 32A and a second plate portion 32B. The first plate portion 32A has a plate surface extending in the vertical direction to be parallel to the plate surface of the sensor board 30. The second plate portion 32B slightly protrudes outwardly from a lower end of the first plate portion 32A and extends downwardly. The plate member 32 is a protection member that protects the slider 10 from coming in contact with the sensor boards 30 when the slider 10 is mounted to the stationary module 20.

Two connectors 27 are mounted on an outer side with respect to the sensor board 30 and at a height corresponding to the second plate portion 32B of the plate member 32. The connectors 27 are arranged in the vertical direction and one of the connectors 27 is connected to the armature coils 25 to supply electric power to the armature coils 25 and another one of the connectors 27 is connected to the sensor board 30. A hole is formed in a portion of the second plate portion 32B that corresponds to the connectors 27 and the connectors 27 are seen from the outside of the stationary module 20 through the hole. This enables the connectors 27 to be connected to corresponding connectors.

As illustrated in FIGS. 5 and 6, an outer side surface of the rail fixing portion 24C of the frame 24 that faces the sensor board 30 has a positioning portion 24D with which each sensor board 30 is positioned when mounted on the frame 24. In this embodiment, the positioning portion 24D is a through hole (not illustrated) for receiving a fixing pin. Positioning pins 36 are fitted through the through holes of the positioning portion 24D corresponding to the two upper portions on a plate surface of each sensor board 30 and the positioning pins 36 are fixed to the frame 24. Each sensor board 30 is fixed to the frame 24 by the positioning pins 36. The connector 27 is arranged on a lower side of each sensor board 30. However, the connector 27 is not illustrated in FIG. 5.

An inner diameter of the through hole of the positioning portion 24D and an outer diameter of a portion of the positioning pin 36 that passes through the through hole is substantially the same. This fixes each of the sensor boards 30 to the frame 24 without rattling. Each of the sensor boards 30 is positioned with respect to the frame 24 with high precision and fixed to the frame 24. Therefore, positioning between the frame 24 and the detectors 34, 35 arranged on each sensor board 30 is highly precise.

When the stationary module 20 is manufactured, four sensor boards 30 are arranged on the frame 24 at certain intervals and fixed to the frame 24. If the sensor board 30 is fixed to the frame 24 at only one portion of a plate surface of the sensor board 30, the sensor board 30 may be rotated around an axis of the positioning pin 36 when the sensor board 30 is mounted to the frame 24. This may cause an error in mounting positions of the sensor boards 30. In this embodiment, each sensor board 30 is fixed to the frame 24 at two portions on its plate surface. With such a configuration, an error in mounting positions of the sensor boards is less likely to be caused, and each sensor board 30 can be fixed to the frame 24 with positioning at high precision. As a result, intervals between the four sensor boards 30 are maintained with high precision in one stationary module 20.

Next, connection of the stationary modules 20 that is performed by a user will be described. As illustrated in FIG. 4, longitudinal dimensions (length dimensions in an extending direction of the rail 22) of the rail 22 and the frame 24 are different from each other. Specifically, the rail 22 has the longitudinal dimension slightly greater than the frame 24, and a longitudinal end portion 22B of the rail 22 located on a slightly outer side with respect to a longitudinal end portion 24E of the frame 24 in the longitudinal direction (see FIG. 6). The end portion 22B of the rail 22 has a flat surface that is perpendicular to the extending direction of the rail 22 and has highly accurate flatness.

In connecting the stationary modules 20, the end portions 22B of the adjacent stationary modules 20 are set to be in contact with each other first, the stationary modules 20 in such a condition are arranged as illustrated in FIGS. 7 and 8. Since the end portion 22B of the rail 22 has the flat surface of highly accurate flatness, the end portions 22B of the adjacent rails 22 are in contact with each other without having any space therebetween. Then, the adjacent stationary modules 20 are connected to each other by a connecting member (not illustrated) while keeping such a contact state. Accordingly, as illustrated in FIG. 7, the adjacent stationary modules 20 are connected to each other such that the end portions 22B of the adjacent rails 22 are in contact with each other and a gap C is provided between the adjacent frames 24.

Figure 9:
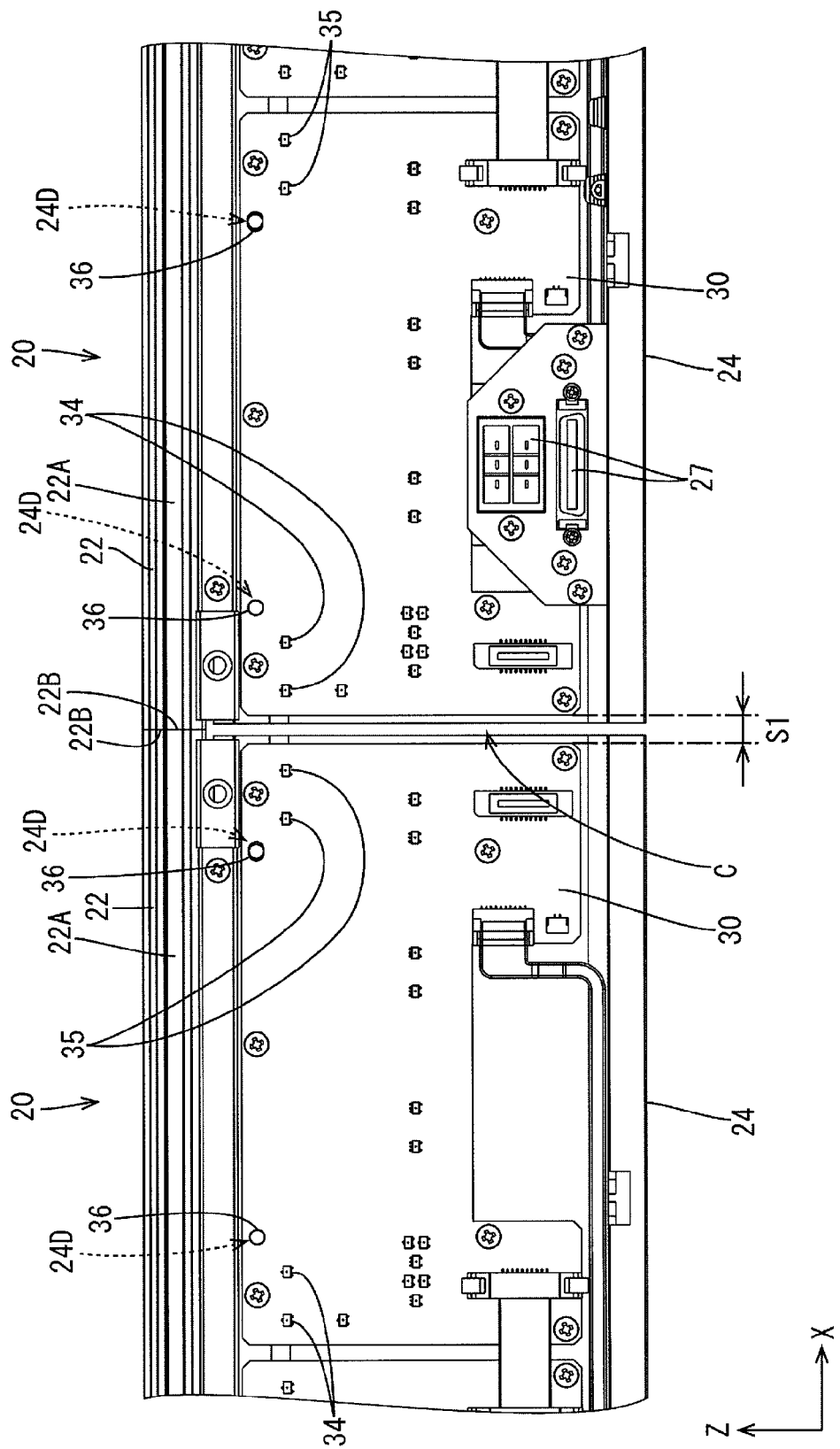
FIG. 9 is an enlarged front view of a connection portion of the stationary modules in FIG. 7.

The end portions 22B of the rails 22 having accurate flatness are set to be in contact with each other and the adjacent stationary modules 20 are connected to each other regarding the end portion 22B as the reference. This ensures precision in the intervals between the adjacent stationary modules 20 and precision in the intervals between the adjacent sensor boards 30 mounted on the adjacent stationary modules 20. Accordingly, a gap 51 formed between the adjacent sensor boards 30 that are mounted on the adjacent stationary modules 20 (see FIG. 9) is less likely to have variation when a user connects the stationary modules 20.

(Configuration of Slider)

Figure 10:
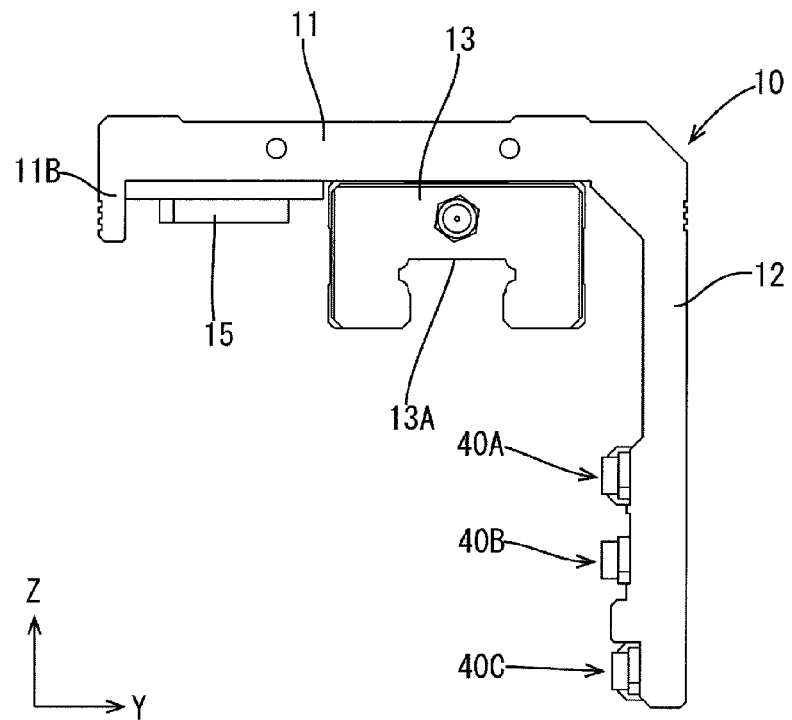
FIG. 10 is a side view of the slider.

A configuration of the slider 10 that moves along the rail 22 of each of the linear conveyance units 4A, 4B will be described. In the following description, the X-axis direction corresponds to the right and left direction, the moving direction or the elongated direction of the slider 10, the Y-axis direction corresponds to the front and rear direction or a width direction of the slider 10, and the Z-axis direction corresponds to the vertical direction or a height direction of the slider 10. As illustrated in FIG. 10, the slider 10 has a substantially L-shape with its side view. The slider 10 includes a rectangular upper plate portion 11 and a rectangular side plate portion 12. The upper plate portion 11 is positioned above the rail 22 and the stator 26 and the side plate portion 12 is positioned to face a side surface of the frame 24 on which the sensor boards 30 are provided, when the slider 10 is mounted on the stationary module 20.

Figure 11:
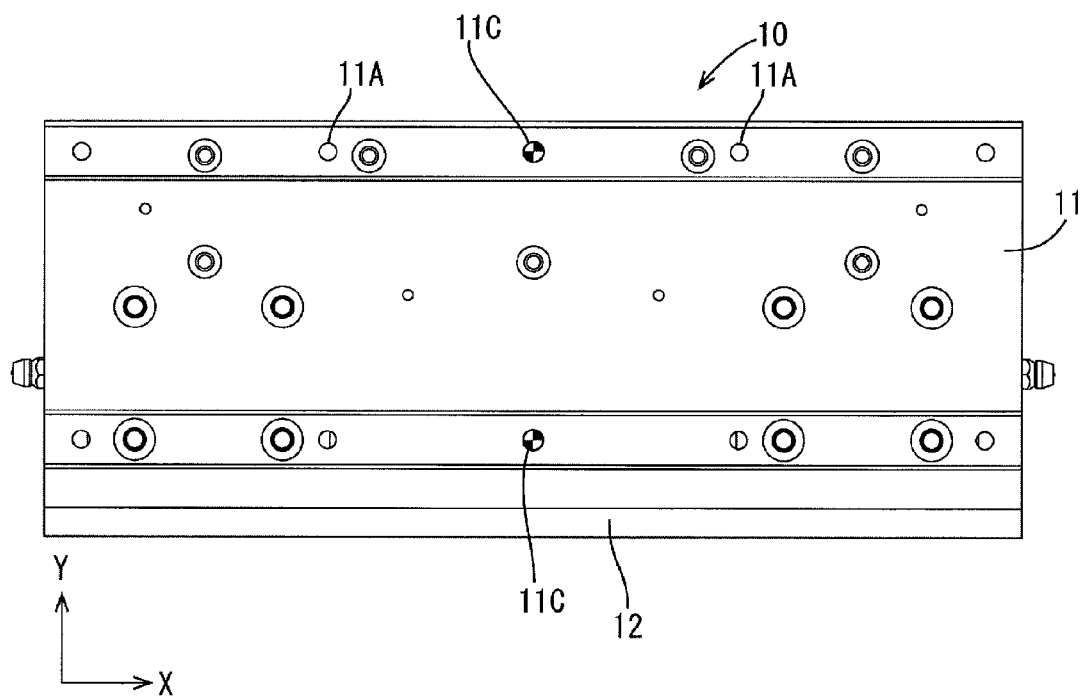
FIG. 11 is a front plan view of the slider.

As illustrated in FIG. 11, the upper plate portion 11 has mounting holes 11A in its upper surface. A board receiver receiving a board that is to be placed on the slider 10 and conveyed is mounted on the slider 10 with the mounting holes 11A. The upper plate portion 11 has position marks 11C on its substantially middle portion with respect to its longitudinal direction and on both end sides thereof in its width direction.

Figure 12:
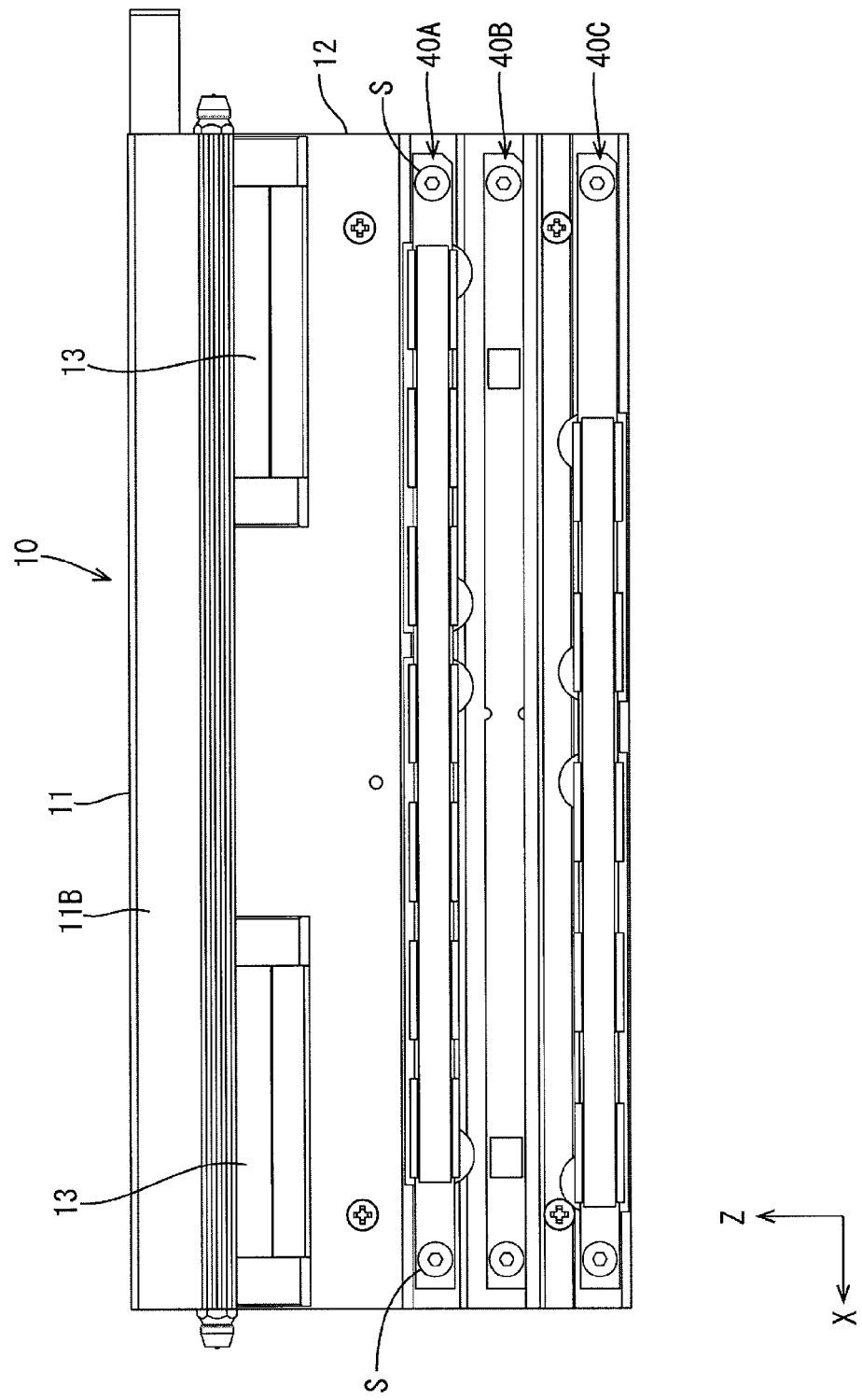
FIG. 12 is a rear surface side view of the slider.

As illustrated in FIG. 12, the upper plate portion 11 includes two rail guides 13 on its rear surface and the rail guides 13 extend in the moving direction of the slider 10. The two rail guides 13 are arranged in the respective end portions with respect to the elongated direction of the slider 10. Each of the rail guides 13 has the guide groove 13A that is open downwardly and extends in the elongated direction of the rail guide 13 or the moving direction of the slider 10. The rail 22 is fitted to the guide groove 13A, and a plurality of balls arranged in and along the guide groove 13A come in contact with the rail 22. Accordingly, the slider 10 moves by rotation of the balls.

A plurality of permanent magnets 15 are arranged on the rear surface of the upper plate portion 11 along the long side direction of the upper plate portion 11 (see FIG. 10). The permanent magnets 15 are covered with a mover cover 14. The permanent magnets 15 generate magnetic poles of the mover 16. As illustrated in FIG. 3, the mover cover 14 is fixed to the upper plate portion 11 by screws. The mover cover 14 has a flat surface 14A that covers the permanent magnets 15 and is parallel to a plate surface of the upper plate portion 11. FIG. 10 illustrates the slider 10 in which the mover cover 14 is detached from the upper plate portion 11 and the permanent magnets 15 are uncovered, and FIG. 3 illustrates the slider 10 in which the mover cover 14 is fixed to the upper plate portion 11.

The side plate portion 12 extends from one of the two end portions of the upper plate portion 11 with respect to the width direction. An extending portion 11B extends downwardly from another one of the two end portions that is opposite to the one end (see FIG. 3). The mover 16 and the mover cover 14 are arranged on an inner side with respect to the extending portion 11B. The extending portion 11B protects end portions of the mover 16 and the mover cover 14 that are on one end side in the width direction of the upper plate portion 11.

Figure 13:
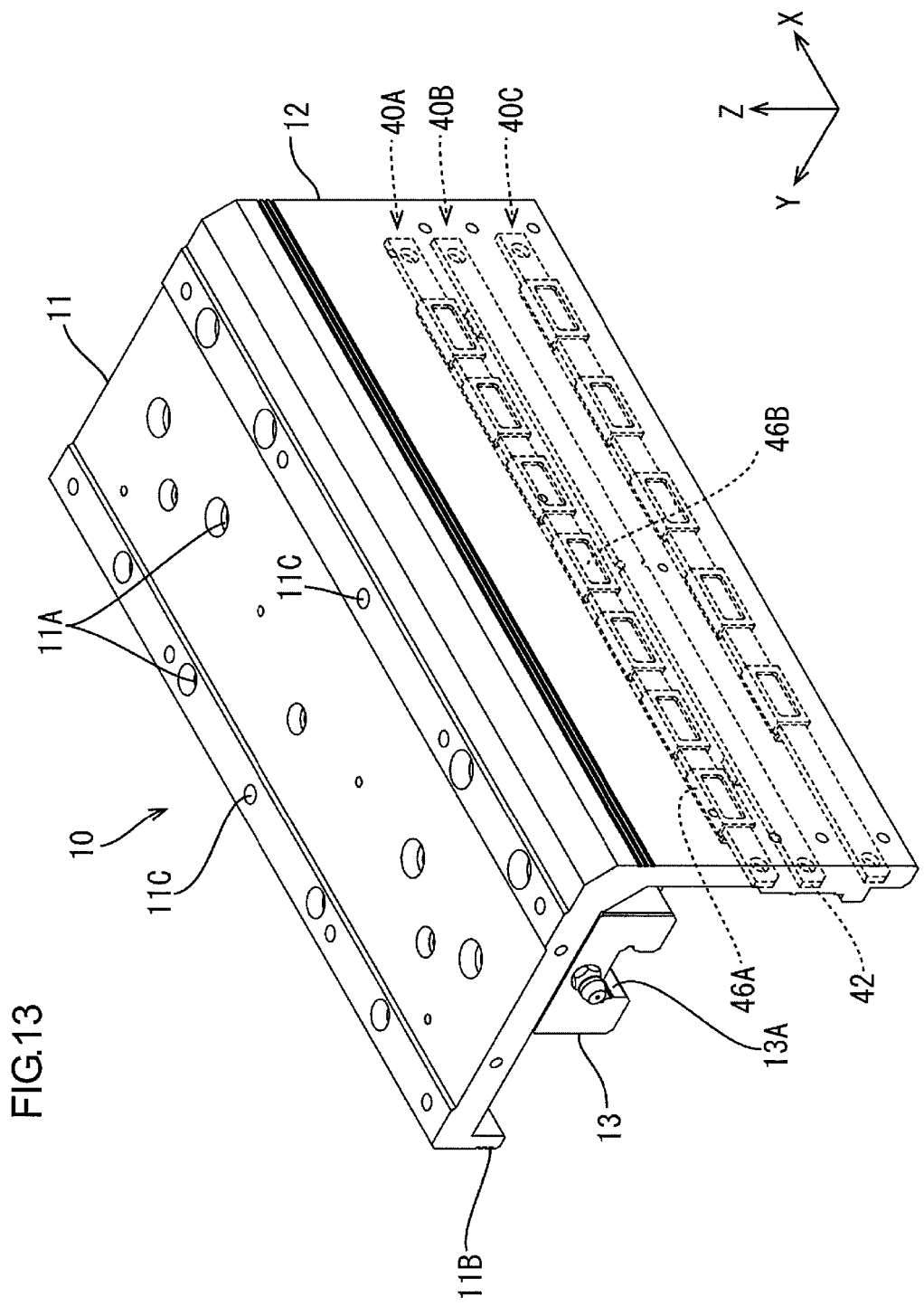
FIG. 13 is a perspective view a part of which is transmissive illustrating an arrangement of magnetic scales.

As illustrated in FIGS. 3, 10, 12 and 13, the side plate portion 12 includes three magnetic scales 40A, 40B, 40C on its rear surface or its inner surface and the magnetic scales 40A, 40B, 40C are arranged in the vertical direction. The magnetic scales 40A, 40B, 40C extend in the right and left direction (the longitudinal direction) of the slider 10 and are covered with a scale cover 18 that is fixed to the side plate portion 12. FIGS. 10, 12 and 13 illustrate the slider 10 in which the scale cover 18 is detached from the side plate portion 12, and FIG. 3 illustrates the slider 10 in which the scale cover 18 is attached to the side plate portion 12.

While the slider 10 is mounted on the stationary module 20, the magnetic scales 40A, 40B, 40C face the respective magnetic sensor groups 31A, 31B, 31C arranged on the sensor board 30 correspondingly. Among the magnetic scales 40A, 40B, 40C, the magnetic scale 40A that is arranged on an uppermost side is a linear scale that detects a position of the slider 10. The magnetic sensor group 31A on the stationary module 20 detects the facing magnetic scale 40A and according to the detection, certain signals are output from the sensor board 30 to detect the position of the slider 10.

The slider 10 having the above configuration is arranged such that the upper plate portion 11 of the slider 10 is parallel to the rail fixing portion 24C of the stationary module 20 (see FIG. 3) and the guide groove 13A of the rail guide 13 is fitted on the rail 22 of the stationary module 20. Accordingly, the slider 10 is mounted on the stationary module 20. The slider 10 that is mounted on the stationary module 20 slides along the rail 22 that is fitted to the guide groove 13A and moves along the stationary module 20 in the right and left direction or the extending direction of the linear conveyance units 4A, 4B.

(Configuration of Magnetic Scale)

Figure 14:
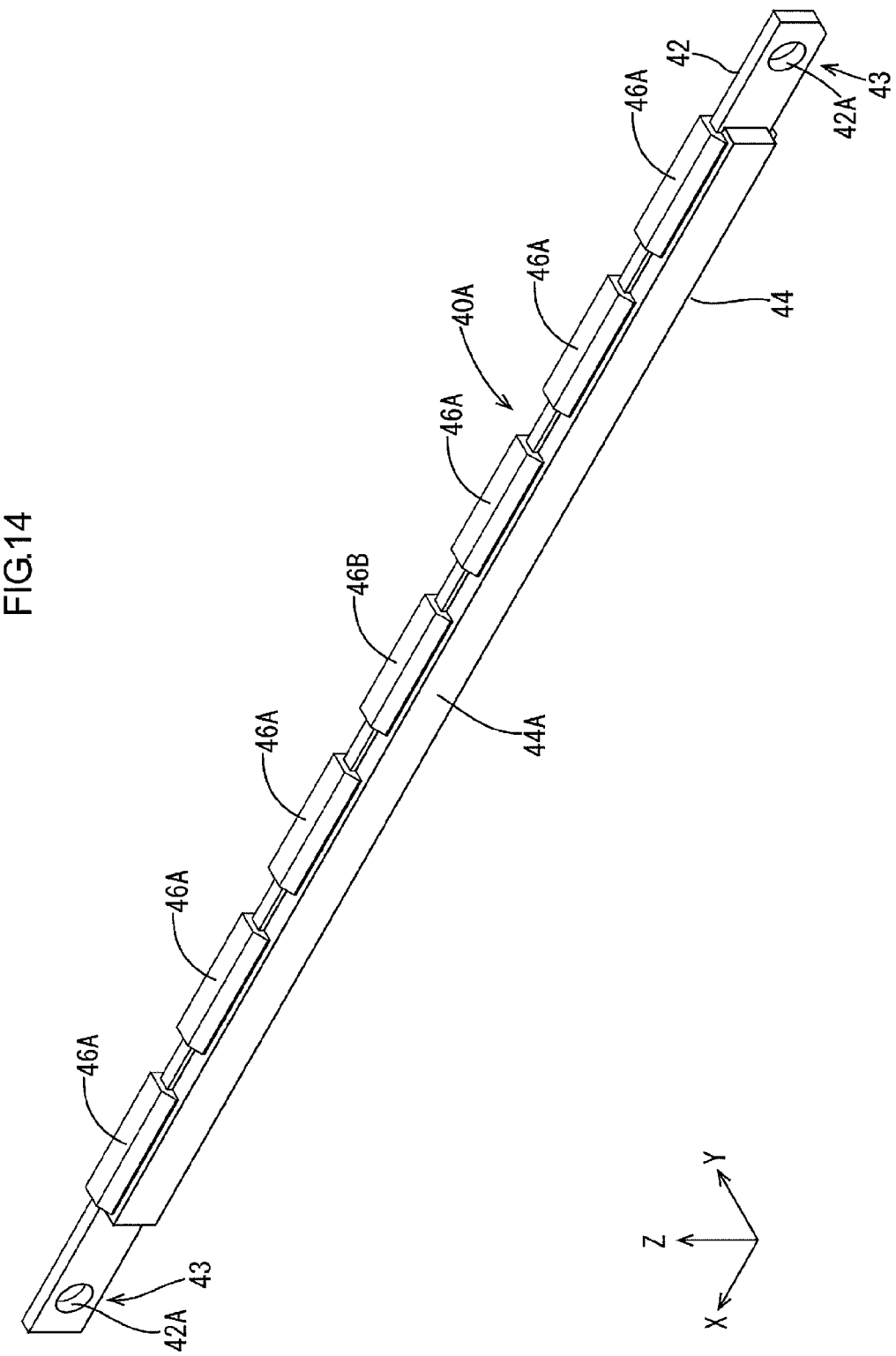
FIG. 14 is a perspective view of the magnetic scale.
Figure 15:
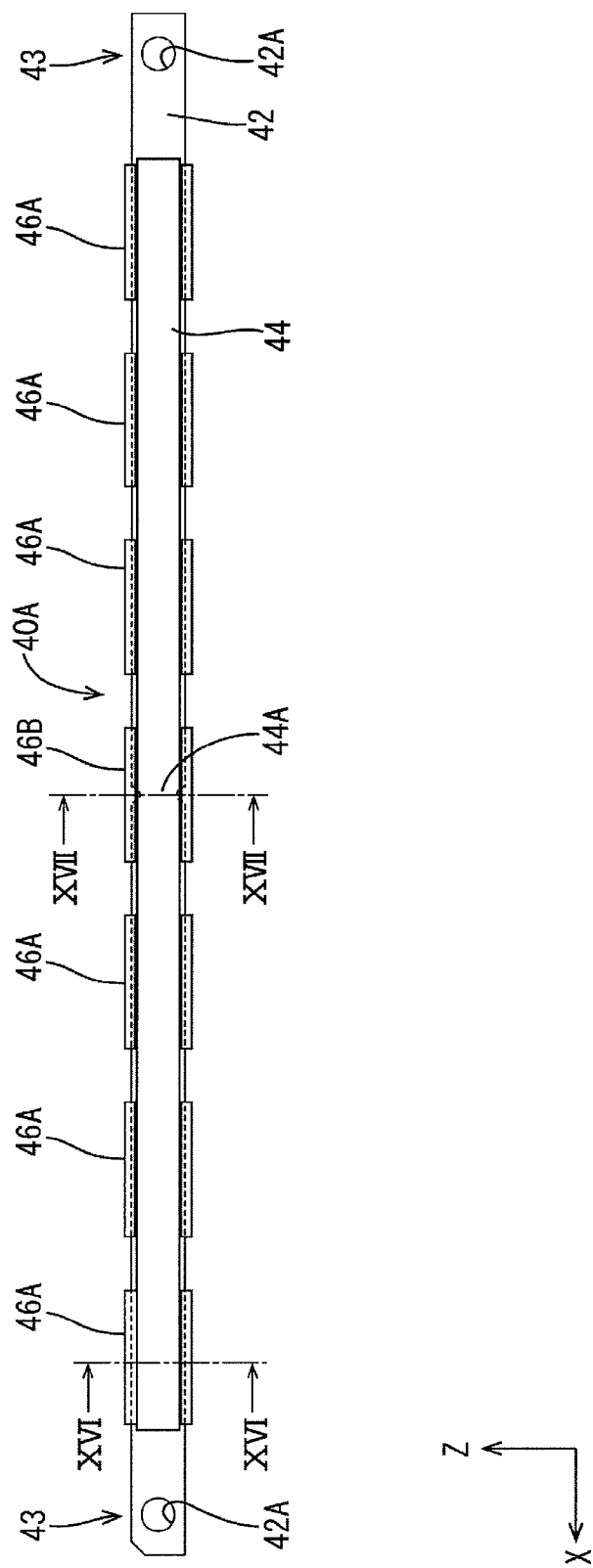
FIG. 15 is a front view of the magnetic scale.

A configuration of the magnetic scale 40A that is used to detect a position of the slider 10 will be described in detail. Hereinafter, the X-axis direction corresponds to a left-and-right direction of the magnetic scale 40A or a moving direction in which the slider 10 moves or a longitudinal direction of the slider 10, the Y-axis direction corresponds to a front-and-rear direction or a thickness direction of the magnetic scale 40A, and the Z-axis direction corresponds to an upper-and-lower direction or a width direction of the magnetic scale 40A. When the magnetic scale 40A is mounted on the slider 10, the upper-and-lower direction, the longitudinal direction, and the thickness direction of the magnetic scale 40A matches the upper-and-lower direction, the longitudinal direction, and the width direction of the slider 10. As illustrated in FIGS. 14, 15 and 18, the magnetic scale 40A includes a back yoke 42, a plastic magnet 44 that is placed over the back yoke 42, band members 46A and a band member 46B that hold collectively the back yoke 42 and the plastic magnet 44 as a unitary component.

The plastic magnet 44 is a plate member that extends in the longitudinal direction of the magnetic scale similarly to the back yoke 42 and is placed on one plate surface of the back yoke 42. The plastic magnet 44 has an upper-and-lower dimension slightly smaller than the back yoke 42. The plastic magnet 44 is arranged within the plate surface of the back yoke 42 in the upper-and-lower direction. The plastic magnet 44 has the longitudinal dimension smaller than the back yoke 42 so that longitudinal side end portions of the back yoke 42 extend further from the respective longitudinal side ends of the plastic magnet 44.

As illustrated in FIGS. 14 and 15, the longitudinal side end portions of the back yoke 42 include mounting portions 43, respectively. Each of the mounting portions 43 is mounted and fixed to the side plate portion 12 of the slider 10. Each of the mounting portions 43 of the back yoke 42 has mounting hole 42A penetrating through the back yoke 42. A screw S is inserted through the mounting hole 42A (see FIG. 12) so that the back yoke 42 is fixed to the side plate portion 12 with screws and the back yoke 42 is mounted to the side plate portion 12. The mounting holes 42A are formed with an effective positioning precision and a positioning jig (not illustrated) having a positioning pin (not illustrated) can be used. The back yoke 42 is fixed with the positioning pin to the side plate portion 12 of the slider 10 with an effective positioning precision.

The plastic magnet 44 is made by mixing magnetic particles into a base member of a resin such as Poly Pheylene Sulfide (PPS). A surface of the plastic magnet 44 that is opposite to the surface on which the back yoke 42 is placed is a magnetized surface that is magnetized with a plurality of poles along its elongated direction. The magnetic scale 40A is mounted on the side plate portion 12 such that the back yoke 42 is disposed between the side plate portion 12 and the plastic magnet 44. With such a configuration, when the slider 10 is mounted on the stationary module 20, the magnetic surface of the plastic magnet 44 faces the magnetic sensor group 31A of the sensor board 30 that is mounted on the stationary module 20.

The band members 46A, 46B are made of resin and are arranged in the longitudinal direction of the magnetic scale 40A at equal intervals. A total number of the band members 46A, 46B is seven. Each of the band members 46A, 46B has a shape so as to wrap a surface of the back yoke 42 that is opposite to the surface having the plastic magnet 44 thereon and hold the plastic magnet from the upper and the lower sides. Accordingly, each of the band members 46A, 46B collectively holds the back yoke 42 and the plastic magnet 44.

Other than the band member 46B that is arranged in a substantially middle portion with respect to the longitudinal direction of the magnetic scale 40A, each of six band members 46A is fixed only to the corresponding plastic magnet 44 so as to hold the plastic magnet 44 from the upper and the lower sides and is not fixed to the back yoke 42. The portion of the plastic magnet 44 other than the portion that is held by the band member 46B includes the portions of the plastic magnet 44 that are held by the respective six band members 46A, and the portion of the plastic magnet 44 other than the portion held by the band member 46B is movable and deformable together with the band members 46A relative to the back yoke 42 in the longitudinal direction (in the elongated direction of the magnetic scale 40A).

The band member 46B that is arranged in a substantially middle portion with respect to the longitudinal direction is fixed to both of the plastic magnet 44 and the back yoke 42. Therefore, the portion of the plastic magnet 44 that is held by the band member 46B is not movable and deformable relative to the back yoke 42 in the longitudinal direction (in the elongated direction of the magnetic scale 40A). In the following, the portion of the plastic magnet 44 that is held by the band member 46B (that is not movable and deformable) is referred to as a fixed portion 44A. When the magnetic scale 40A is mounted on the slider 10, the magnetic scale 40A is mounted such that the fixed portion 44A is located to correspond to a position of the positioning mark 11C with respect to the left-and-right direction and is located in a same vertical plane as the positioning mark 11C.

Figure 20:
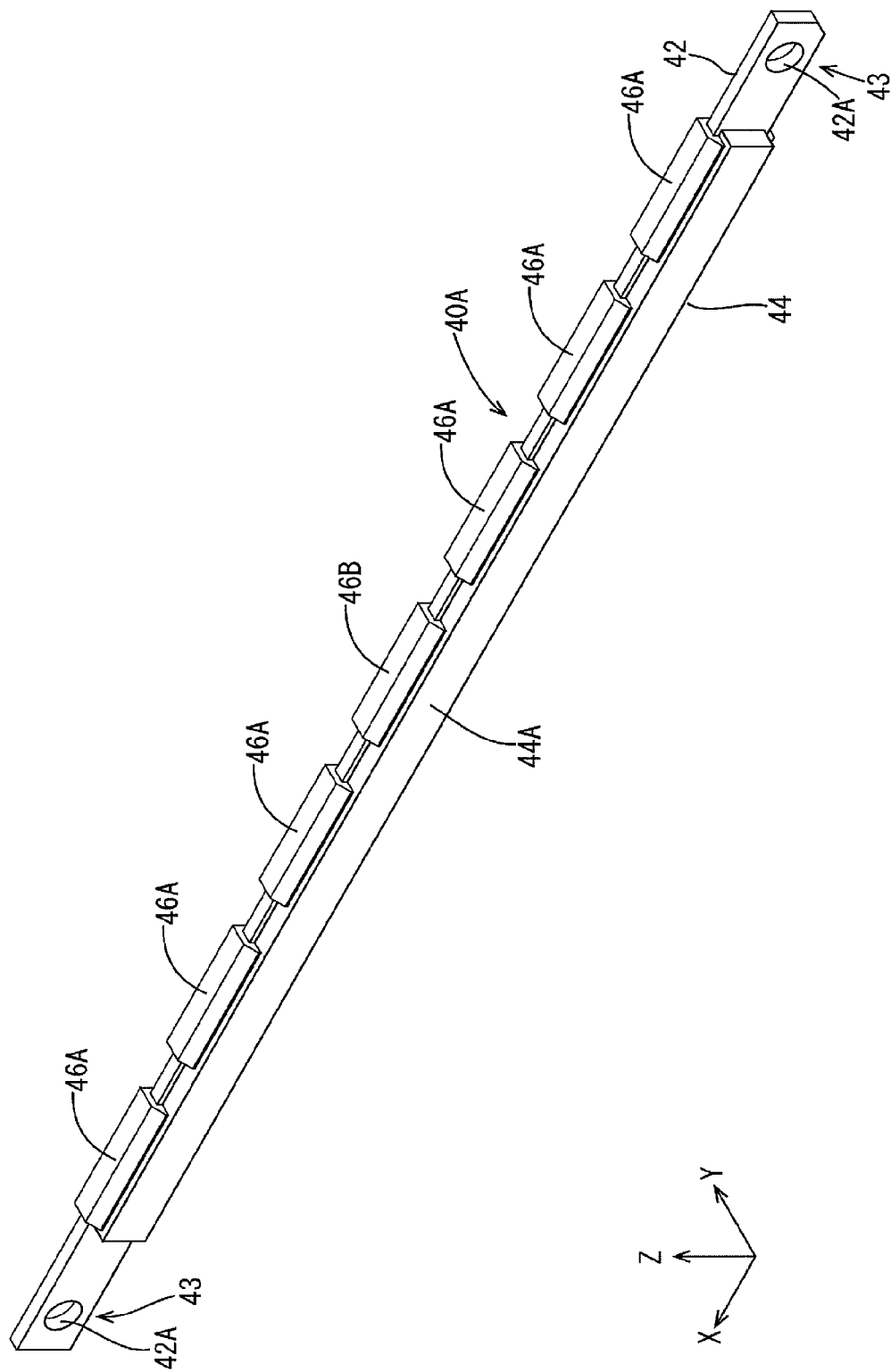
FIG. 20 is a perspective view illustrating a plastic magnet that is fitted to a back yoke.
Figure 21:
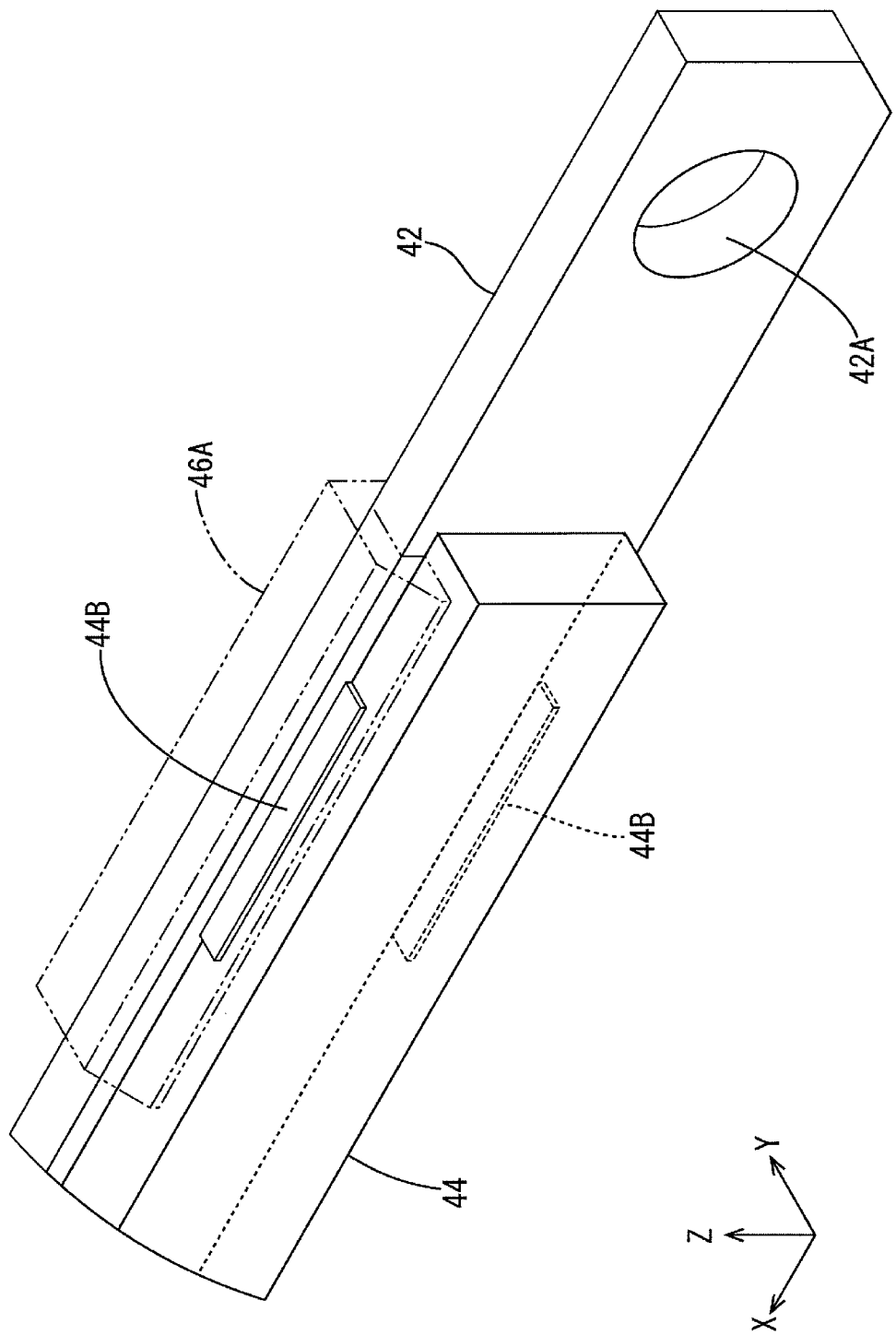
FIG. 21 is an enlarged perspective view illustrating the vicinity of a small projection in FIG. 14.

The mounting of the band members 46A, 46B to the back yoke 42 and the plastic magnet 44 will be described in detail. As illustrated in FIGS. 20 and 21, the plastic magnet 44 includes small projections (one example of projections) 44B at intervals on its upper and lower surfaces that are held by the band members 46A, 46B. Each of the small projections 44B extends in the longitudinal direction (in the elongated direction of the magnetic scale 40A). Each of the small projections 44B is formed on portions of the upper and the lower surface that are closer to the back yoke 42 with respect to the thickness direction of the magnetic scale 40A.

Figure 17:
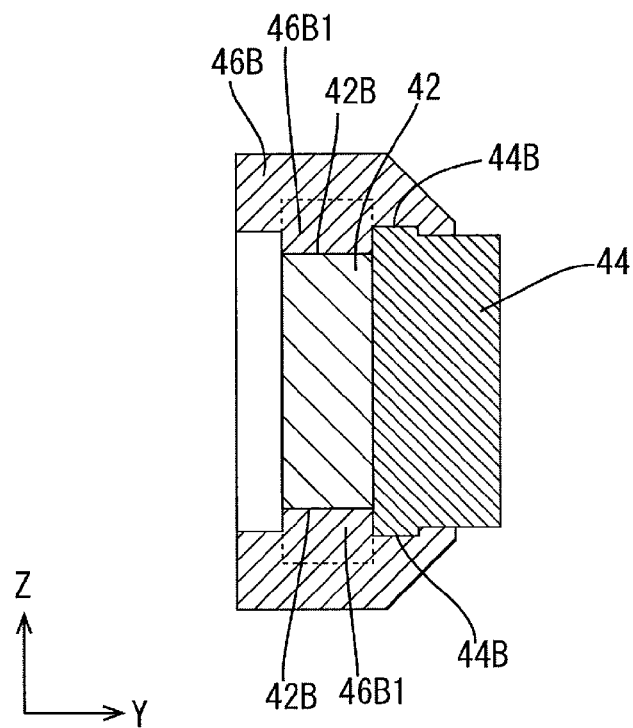
FIG. 17 is a cross-sectional view taken along line XVII-XVII in FIG. 9.
Figure 23:
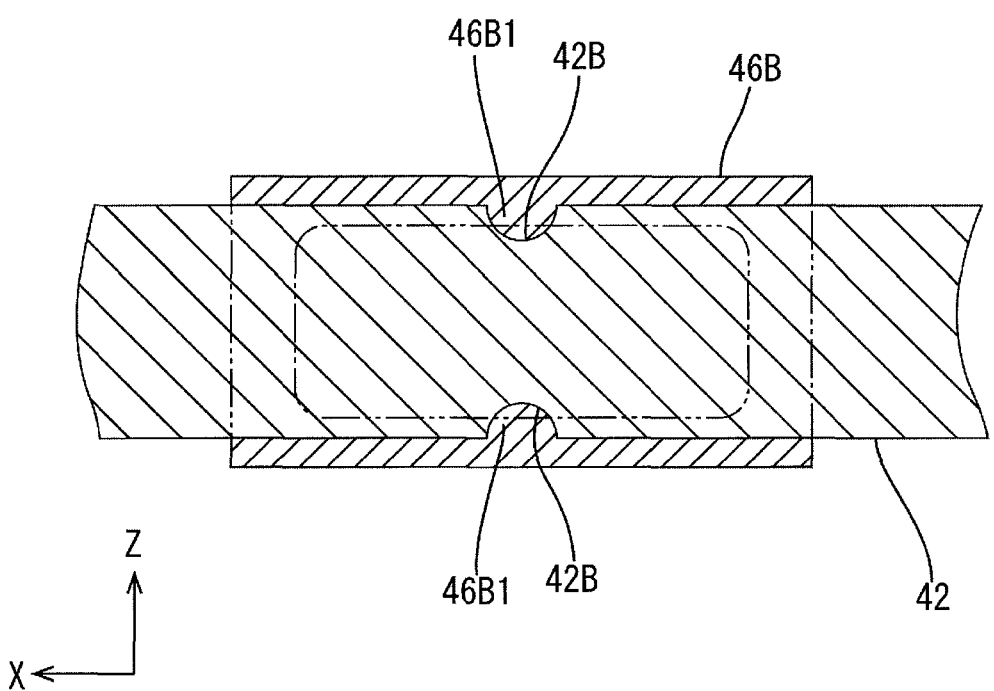
FIG. 23 is a lateral cross-sectional view of the vicinity of the fixed portion of the magnetic scale.

As illustrated in FIGS. 19 and 20, the back yoke 42 has a recess 42B in an upper surface and a lower surface of its substantially middle portion with respect to the longitudinal direction on which the fixed portion 44A of the plastic magnet 44 is placed. The recess 42B has an arched shape with a front view and is formed by cutting out a portion of the upper and lower surfaces of the middle portion of the back yoke 42. The recess 42B is through the back yoke 42 in its thickness direction. The band member 46B that is fixed to the fixed portion 44A of the plastic magnet 44 has projection portions 46B1 on the portions corresponding to the recesses 42B so as to fit to the respective recesses 42B (see FIGS. 17 and 23).

Figure 16:
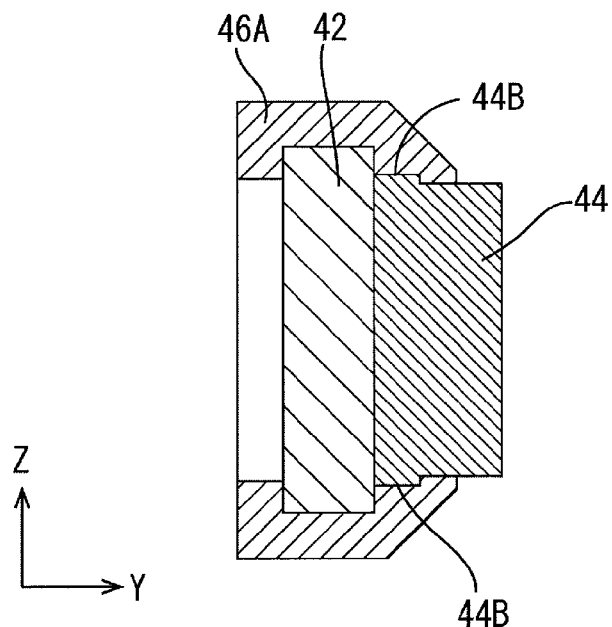
FIG. 16 is a cross-sectional view taken along line XVI-XVI in FIG. 9.
Figure 22:
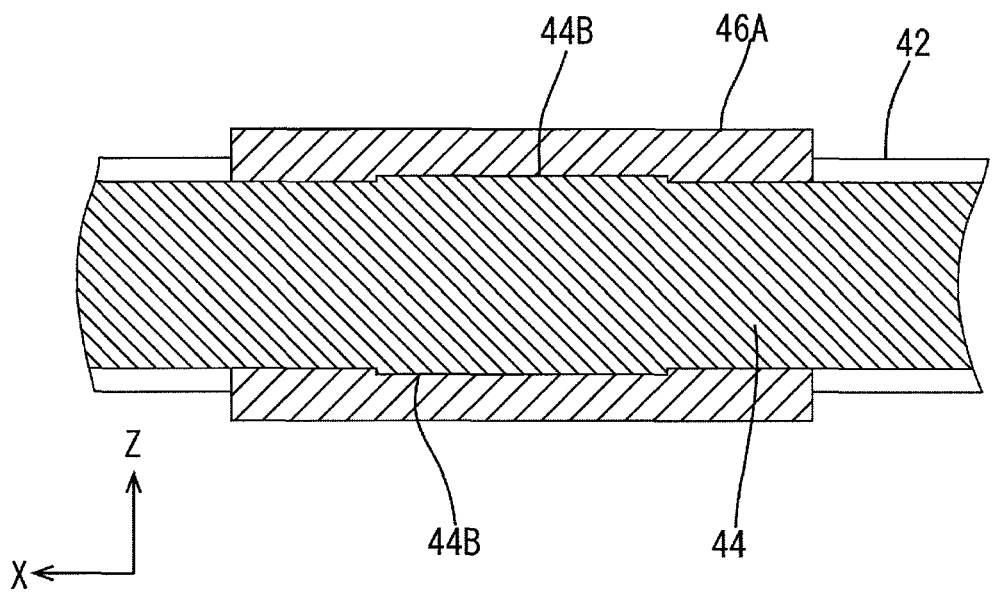
FIG. 22 is a lateral cross-sectional view of an end portion of a magnetic scale.

The band members 46A, 46B are molded as follows. The plastic magnet 44 and the back yoke 42 are arranged in a molding die and thereafter, resin is poured into the molding die to mold the band members 46A, 46B with insert molding. In the insert molding, the resin is poured into a space around the small projections 44B of the plastic magnet 44 within the molding die and then, the band members 46A 46B are molded to wrap the small projections 44B (see FIGS. 16, 17 and 21). Accordingly, the space on the both sides of each small projection 44B with respect to the longitudinal direction within the molding die is filled with the resin and the band members 46A, 46B are molded (see FIG. 22). Thus, the band members 46A, 46B are fixed to the plastic magnet 44 so as not to be movable and deformable relative to the plastic magnet 44.

In molding the band member 46B that is located in the substantially middle portion with respect to the longitudinal direction with the insert molding, if the resin is poured into the space around the small projections 44B within the molding die, the resin is poured into the recesses 42B of the back yoke 42 and the recesses 42B are filled with the resin that forms parts of the band member 46B. The resin that is poured into the recesses 42B forms the projection portions 46B1 (see FIGS. 17 and 23), and the band member 46B is fixed to the back yoke 42 so as not to be movable and deformable relative to the back yoke 42 in the longitudinal direction.

Thus molded band members 46A, 46B collectively hold the plastic magnet 44 and the back yoke 42 as an integral or unitary component. The plastic magnet 44 and the back yoke 42 are fixed to each other by the band member 46B at the fixed portion 44A of the plastic magnet 44 such that both of the plastic magnet 44 and the back yoke 42 are not relatively movable and deformable with each other in the longitudinal direction. The portion of the plastic magnet 44 other than the fixed portion 44A is fixed to the band member 46A such that only the plastic magnet 44 is not movable and deformable relative to the band member 46A in the longitudinal direction.

The back yoke 42 is made of metal such as iron or stainless and therefore, the difference in the linear expansion coefficients is great between the plastic magnet 44 and the back yoke 42. Therefore, if the magnetic scale 40A is moved from the normal temperature environment to the high temperature environment, the plastic magnet 44 may be expanded further than the back yoke 42 in its longitudinal direction and the plastic magnet 44 may be deformed and moved relative to the back yoke 42 in the longitudinal direction. Accordingly, the plastic magnet 44 may be displaced from the original position with respect to the back yoke 42 in the normal temperature environment.

If the magnetic scale 40A according to the present embodiment having the above configuration is moved from the normal temperature environment to the high temperature environment, the portion of the plastic magnet 44 other than the fixed portion 44A deforms and moves relative to the back yoke 42 in the longitudinal direction and the fixed portion 44A of the plastic magnet 44 does not deform and move relative to the back yoke 42 in the longitudinal direction and stops in the original position. Then, if the magnetic scale 40A is returned and moved back from the high temperature environment to the normal temperature environment, the portion of the plastic magnet other than the fixed portion 44A shrinks much more greatly than the back yoke 42 with regarding the fixed portion 44A as a reference and moves and deforms relative to the back yoke 42 in the longitudinal direction. As a result, the portion of the plastic magnet 44 other than the fixed portion 44A deforms and returns or recovers to its original position with respect to the back yoke 42.

Even if the magnetic scale 40A according to the present embodiment is moved to the high temperature environment and returned to the normal temperature environment thereafter, the relative positions of the plastic magnet 44 and the back yoke 42 are returned or recovered to the original positions. Therefore, due to the change in the relative positions of the plastic magnet 44 and the back yoke 42, the errors in detecting the magnetic scales 40A of the sliders 10 by the detection sensor group 31A or the errors in detecting the positions of the sliders 10 are less likely to be caused.

Advantageous Effects of the Present Embodiment

As described above, in the linear conveyer 1 according to the present embodiment, the detection sensor group 31A detects magnetic flux generated by the magnetic scale 40A to detect the position of the slider 10 that is mounted on the rail 22. The magnetic scale 40A includes the plastic magnet 44 as the magnet. Therefore, compared to the configuration in which a neodymium magnet is used, the weight of the magnetic scale 40A and the weight of the slider 10 including the magnetic scale 40A are reduced.

In the linear conveyer 1 according to the present embodiment, if the magnetic scale 40A of the slider 10 thermally expands due to the change in the environmental temperature, the portion of the plastic magnet 44 of the magnetic scale 40A other than the fixed portion 44A deforms, moves and expands relative to the back yoke 42 along the extending direction of the magnetic scale 40A (the X-axis direction). If the magnetic scale 40A shrinks due to the change in the environmental temperature, the portion of the magnetic scale 40A other than the fixed portion 44A deforms, moves and shrinks relative to the back yoke 42 along the extending direction of the magnetic scale 40A. If the change degree of the environmental temperature is substantially the same in the expanding and in the shrinking (for example, when the slider is moved from the normal temperature environment to the high temperature environment and thereafter moved back to the normal temperature environment), the plastic magnet 44 deforms with the substantially same change degree with the fixed portion 44A as a reference both in the expanding and the shrinking. As a result, the plastic magnet 44 deforms and returns or recovers to the relative position with reference to the back yoke 42 before the expanding. The plastic magnet 44 deforms with the fixed portion as a reference. Therefore, the plastic magnet 44 is less likely to be displaced with respect to the back yoke 42 after the expanding and the shrinking, and the errors in detecting the positions of the sliders 10 are less likely to be caused. Accordingly, in the linear conveyer 1 according to the present embodiment, the weight of the slider 10 is reduced and the errors in detecting the positions of the sliders 10 are less likely to be caused.

In the linear conveyer 1 according to the present embodiment, the back yoke 42 includes the mounting portions 42 on its longitudinal ends that are mounted and fixed to the slider 10. The plastic magnet 44 is fixed to the slider 10 via the back yoke 42. If the plastic magnet 44 has a screw hole in a part thereof and is fixed to the slider 10 with a screw, the change degrees of deformation in the plastic magnet 44 in the expanding and the shrinking are varied between the portion of the plastic magnet 44 having the screw hole and another portion of the plastic magnet 44 without having the screw hole. With such a configuration, after the expansion and the shrinking, the part of the plastic magnet 44 may not be deformed and returned or recovered to the relative position with respect to the back yoke 42 before the expansion. With the configuration according to the present embodiment, the back yoke 42 is fixed to the side plate portion 12 of the slider with being sandwiched between the plastic magnet 44 and the slider 10. Therefore, the plastic magnet 44 does not need to have a screw hole and the plastic magnet 44 is less likely to be displaced from the relative position to the back yoke 42 after the expansion and shrinking.

In the magnetic scale 40A included in the linear conveyer 1 according to the present embodiment, the band members 46A, 46B made of resin hold the back yoke 42 and the plastic magnet 44 collectively to form them as an integral or unitary component. The band members 46A, 46B are fixed to the plastic magnet 44 so as not to be deformable and movable relative to the plastic magnet 44. The six band members 46A other than the band member 46B mounted to the fixed portion 44A are deformable and movable relative to the back yoke 42 along the extending direction of the magnetic scale 40A. With such a configuration, if the plastic magnet 44 expands or shrinks due to the change in the environmental temperature, the band members 46A, 46B deform together with the plastic magnet 44 with the change degree that is substantially the same as the change degree of the deformation in the plastic magnet 44 and the band member 46B deforms relative to the back yoke 42. By using the band members 46A, 46B, the plastic magnet 44 is less likely to be displaced with respect to the back yoke 42 after the expansion and the shrinking and the errors in detecting the positions of the sliders 10 are less likely to be caused.

If the plastic magnet expands or shrinks due to the change in the environmental temperature, the band member deforms relative to the back yoke. By using the band member, the plastic magnet is less likely to be displaced with respect to the back yoke after the expansion and the shrinking and the errors in detecting the positions of the sliders are less likely to be caused. With the above configuration, in the fixed portion, the plastic magnet may be fixed directly to the back yoke or the plastic magnet may be fixed to the back yoke via the band member.

The back yoke 42 that is made of metal is less likely to be bonded effectively to the plastic magnet 44. According to the present embodiment, the band members 46A, 46B made of resin hold the plastic magnet 44 and the back yoke 42 collectively. This achieves the magnetic scale 40A including the back yoke 42 and the plastic magnet 44 as being an integral or unitary component without using the bonding material such as adhesive.

In the linear conveyer 1 according to the present embodiment, the plastic magnet 44 includes the fixed portion 44A in its middle portion with respect to the longitudinal direction (the X-axis direction) of the magnetic scale 40A. If the plastic magnet 44 includes the fixed portion 44A in a portion thereof closer to the end portion from the middle portion in the longitudinal direction of the magnetic scale 40A, the change degrees in deformation of the plastic magnet 44 in the expansion and the shrinking are different in one end side portion of the plastic magnet 44 that is on one side from the fixed portion 44A and in another end side portion thereof that is on another side from the fixed portion 44A. According to the present embodiment, the plastic magnet 44 includes the fixed portion 44A in the middle portion thereof in the longitudinal direction of the magnetic scale 40A. With such a configuration, the change degrees in deformation of the plastic magnet 44 in the expansion and the shrinking are substantially the same in one end side portion of the plastic magnet 44 from the fixed portion 44A and in another end side portion thereof from the fixed portion 44A. Therefore, after the expansion and the shrinking of the plastic magnet 44, the plastic magnet 44 can be deformed and returned or recovered to the original position relative to the back yoke 42 before the expansion at a high precision. As a result, the errors in detecting the positions of the sliders 10 are further less likely to be caused.

In the linear conveyer 1 according to the present embodiment, the slider 10 has mounting holes 11A with effective position accuracy. An object to be placed on the slider 10 is mounted with the mounting holes 11A. One of the mounting holes 11A is provided to correspond to the fixed portion 44A of the magnetic scale 40A to be in a same vertical plane as the fixed portion 44A. Thus, the magnetic scale 40A is mounted to the slider 10 such that one of the mounting holes 11A is on the same vertical plane as the fixed portion 44A, and accordingly, the magnetic scale 40A is mounted to the slider 10 with high accuracy. The errors in detecting the positions of the sliders 10 are further less likely to be caused.

In the linear conveyer 1 according to the present embodiment, the plastic magnet 44 is used as the magnet for the magnetic scale 40A. With such a configuration, compared to the configuration in which the neodymium magnet is used as the magnet, a cost for the components is greatly reduced.

In the slider, the positioning portion for positioning an object on the slider is provided with effective position accuracy. With the above configuration, the magnetic scale is mounted on the slider such that the fixed portion is located to correspond to the positioning portion and to be in a same vertical plane as the positioning portion. Accordingly, the magnetic scale is mounted on the slider with high accuracy. The errors in detecting the positions of the sliders are further less likely to be caused.

The plastic magnet and the back yoke are arranged in a molding die and thereafter, resin is poured into the molding die to mold the band member with insert molding. In molding with such insert molding, the resin is poured into the recess in the fixed portion and the recess is filled with the resin. Accordingly, a projection portion is formed and the molded projection portion and the recess are fitted to each other. Thus, the back yoke is fixed to the band member in the fixed portion. This achieves a specific configuration in which the plastic magnet is fixed to the back yoke via the band member in the fixed portion.

The plastic magnet and the back yoke are arranged in a molding die and thereafter, resin is poured into the molding die to mold the band member with insert molding. In molding with such insert molding, the resin is poured into a space around the projection to wrap the projection and the space is filled with the resin. Thus, the plastic magnet is fixed to the band member at the portion thereof having the projection. This achieves a specific configuration in which the plastic magnet is fixed to the band member.

In the linear conveyer 1 according to the present embodiment, the rail 22 has a length in its extending direction (the X-axis direction) that is slightly greater than the frame 24. The stationary modules 20 are arranged such that the end portions 22B of the rails 22 that are longer than the frame 24 are set in contact with each other. With this configuration, the interval between the stationary modules 20 is always constant regarding the length of the rail 22 as a reference. Therefore, if the stationary modules 20 are connected by a user, errors in connecting the stationary modules 20 are less likely to be caused for every connecting performance. This improves accuracy of the intervals between the connected stationary modules 20. The frame 24 having a length in the extending direction of the rail 22 (in the X-axis direction) that is smaller than the rail 22 has the positioning portion 24D with which the sensor board 30 having the magnetic sensor group 31A is positioned. The frame 24 is positioned to have constant position relationship with respect to the rail 22 that is considered as a reference. With such a configuration, in each of the stationary modules 20, the magnetic sensor group 31A is mounted on the sensor board 30 with the constant position relationship with respect to the rail 22 that is considered as a reference. Therefore, each interval between the detectors 34, 35 of the magnetic sensor group 31A in one stationary module 20 and the detectors 34, 35 in another stationary module 20 that is adjacent to the one stationary module 20 becomes more accurate. Each interval between the detectors 34, 35 and the detectors 34, 35 of the adjacent stationary modules 20 becomes more accurate, and this enhances accuracy in detecting positions of the sliders 10 that move along the connected stationary modules 20. Therefore, the errors in detecting the positions of the sliders 10 are less likely to be caused.

The linear conveyer 1 according to the present embodiment includes four sensor boards 30 on each of which the magnetic sensor group 31A is mounted in a predetermined position and that are mounted on the stationary module 20. The positioning pins 36 are provided in the positions corresponding to the respective positioning portions 24D. With such a configuration, intervals between the stationary modules 20 are always constant and this enhances accuracy of the intervals between the adjacent sensor boards 30 each of which is included in each of the adjacent stationary modules 20. Therefore, errors in detecting the positions of the sliders 10 are less likely to be caused.

In the linear conveyer 1 according to the present embodiment, the positioning portion 24D is a through hole formed in the sensor board 30 and the positioning pin 36 is inserted through the through hole and the sensor board 30 is fixed to the frame 24. The inner diameter of the through hole and the outer diameter of the positioning pin 36 are adjusted such that the positioning pin 36 is inserted through the through hole without having any gap therebetween. Accordingly, the positioning pin 36 and the through hole are fitted to each other with constant positioning relationship and the sensor boards 30 are mounted on the frame 24 with a constant position relationship.

Second Embodiment

A second embodiment of the present technology will be described with reference to FIGS. 24 to 26. According to the second embodiment, arrangement of a rail 122 to a frame 124 and positioning of sensor boards 130 are different from those in the first embodiment. Other components are similar to those in the first embodiment, and configurations, operations, and effects thereof will not be described.

As illustrated in FIG. 24, in a stationary module 120 according to the second embodiment, the rail 122 is arranged at one end of a rail fixing portion 124C with respect to a width direction (at one end close to the sensor board 130). As illustrated in FIGS. 25 and 26, positioning portions 124D for positioning the sensor boards 130 are not provided on the frame 124 but on a long-side surface of the rail 122 that is on a lower side from the recess 122A. According to the present embodiment, the positioning portions 124D are directly provided on the rail 122 that is used as a reference when the stationary modules 120 are connected to each other. Specifically, the positioning portions 124D are provided in two end side portions of an upper end portion of each sensor board 30 with respect to the longitudinal direction. Each sensor board 130 is positioned and fixed by two positioning portions 124D.

Figure 26:
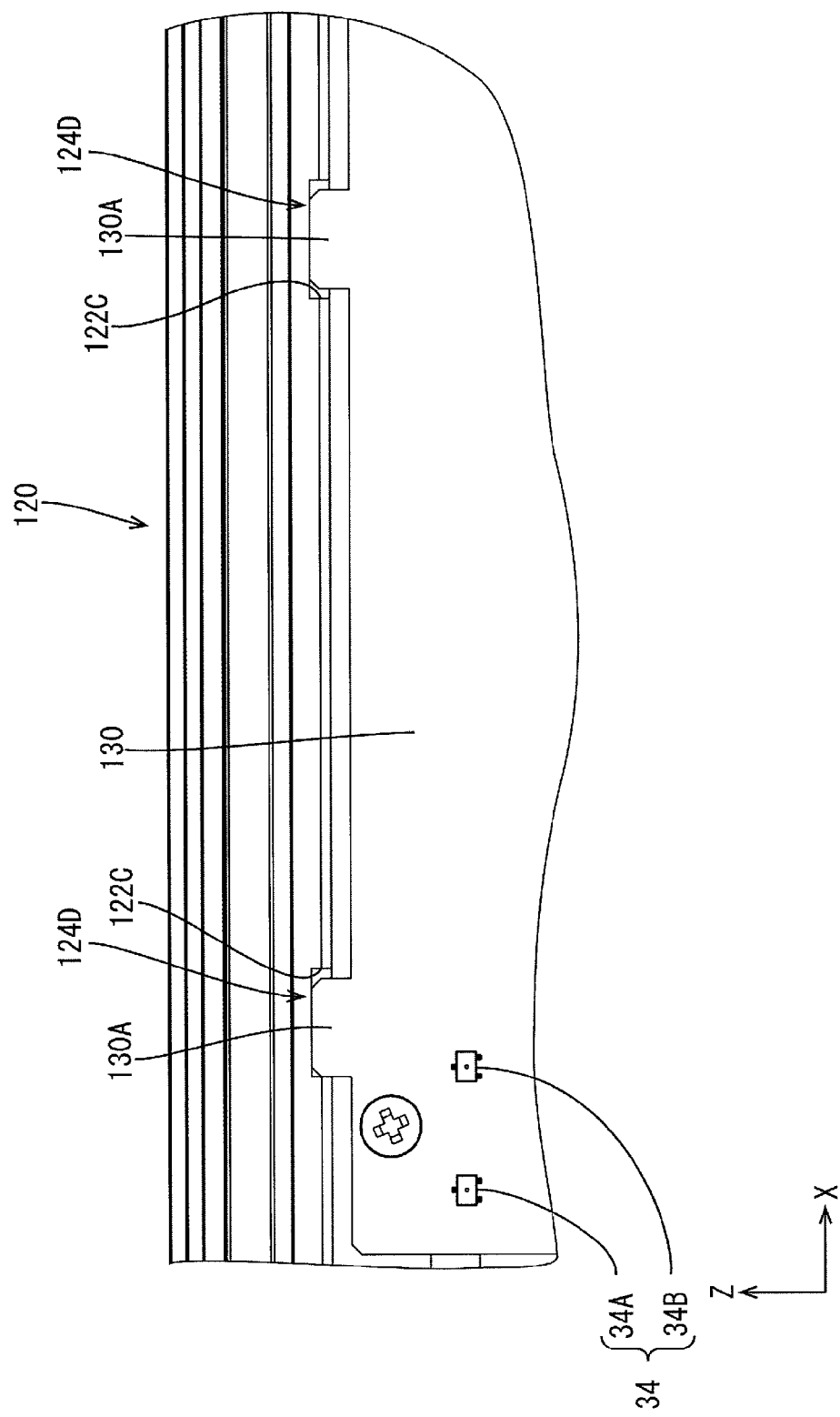
FIG. 26 is an enlarged front view of the vicinity of a positioning portion in FIG. 25.

As illustrated in FIG. 26, the positioning portion 124D of the rail 122 includes a contact portion 122C that is a recess cut out to open downwardly. Each sensor board 130 includes an extending portion 130A so as to correspond to the positioning portion 124D included in the rail 122. The extending portion 130A projects upwardly from an outer end of a plate surface of the sensor board 130. Each of the extending portions 130A has a substantially rectangular front view shape and comes in contact with a portion of the contact portion 122C with respect to the longitudinal direction or the extending direction of the rail 122.

One of the two extending portions 130A is in contact with the contact portion 122C of the rail 122 such that each sensor board 130 is positioned with respect to the rail 122. In the example in FIG. 26, the left one of the two extending portions 130A extending from an outer end of the sensor board 130 is in contact with the contact portion 122C with respect to the longitudinal direction. Specifically, one of the extending side surfaces of the extending portion 130A is in contact with one of the side inner surfaces of the recess of the contact portion 122C. With such a configuration, the sensor board 130 is positioned and fixed to the stationary module 20 without rattling in the longitudinal direction and with high positioning accuracy.

As described before, in the linear conveyer according to the present embodiment, the positioning portion 124D is provided directly on the rail 122 that is regarded as a reference when the stationary modules 120 are connected to each other. In the positioning portion 124D, the two extending portions 130A included in each sensor board 130 come in contact with the contact portion 122C provided in the rail 122 so that portions of the extending potions 130 are positioned with respect to the contact portion 122C without any gap. Accordingly, each sensor board 130 can be mounted on the frame 124 with a constant position relationship with respect to the contact portion 122C that is a portion of the rail 122 with high accuracy. As a result, this enhances accuracy of the intervals between the detectors 134, 135 of the magnetic sensor group of one stationary module 120 and the detectors 134, 135 of anther stationary module 120 that is adjacent to the one stationary module 120, and the errors in detecting positions of the sliders 110 are less likely to be caused.

Other Embodiments

The present technology is not limited to the description as described above with reference to the drawings. For example, the present technology may include the following embodiments.

(1) In the above embodiments, the back yoke and the plastic magnet are held by the band members as a unitary component. However, the back yoke and the plastic magnet may be mounted to each other by any other member than the band member.

(2) In the above embodiments, the plastic magnet includes the fixed portion in its substantially middle portion in the extending direction of the magnetic scale. However, the plastic magnet may include the fixed portion in a portion thereof other than the substantially middle portion in the extending direction of the magnetic scale.

(3) In the above embodiments, the plastic magnet includes the small projections as an example of the projections on its upper and lower side surfaces. The small projections are wrapped by the band members. However, the projection does not necessarily have such a shape. The projections may have any shape as long as the plastic magnet is fixed to the band member that wraps the plastic magnet including the projections.

(4) In the above embodiments, in a portion of the back yoke corresponding to the fixed portion, the back yoke has recesses on its upper and lower side surfaces, and the band member has projection portions corresponding to the recesses of the band member. However, the portion corresponding to the fixed portion does not necessarily have such a configuration. For example, the back yoke may have projection portions and the band member may have recesses that can be fitted to the projection portions.

(5) In the above embodiments, the rail has a length along the extending direction of the rail that is greater than the frame. However, the frame may have a length slightly greater than the rail. In such a case, the end portions of the adjacent frames are set in contact with each other and the stationary modules are arranged with such a contact state so that the intervals between the stationary modules become accurate with the frame as a reference.

(6) In the above embodiments, the magnetic sensor group is mounted on the board. However, the magnetic sensor group may be directly arranged on the stationary module. In such a configuration, accuracy of the intervals between the adjacent stationary modules is enhanced to enhance accuracy of the intervals between the magnetic sensor groups of the adjacent stationary modules.

The embodiments according to the present technology are described in detail. However, the above description is only an example and does not limit a scope of the claims. The technology described in the claims includes modifications and variations of the above described specific examples.

The invention claimed is:
1. A linear conveyer comprising:
a stator including armature coils and fixed to the frame; and
a rail fixed to the frame;
a slider movable along the rail by a linear motor, the slider including:
a mover including magnetic poles;
a rail guide fitted on the rail; and
a plastic magnet having magnetic poles and extending along an extending direction in which the rail extends; and
a back yoke on which the plastic magnet is placed, wherein
a position of the slider is detected by the magnetic sensor and the magnetic scale,
the plastic magnet has a fixed portion that is fixed with respect to the back yoke and a portion other than the fixed portion, the portion other than the fixed portion being movable relative to the back yoke along an extending direction in which the magnetic scale extends,
the plastic magnet includes the fixed portion in a middle portion in the extending direction of the magnetic scale,
the magnetic scale further includes a holding member holding the back yoke and the plastic magnet, the holding member is not movable with respect to the plastic magnet and the back yoke at the fixed portion, and the holding member is not movable with respect to the plastic magnet and is movable with respect to the back yoke in the portion other than the fixed portion.

2. The linear conveyer according to claim 1, wherein the back yoke further includes a mounting portion that is mounted to and fixed to the slider, and the plastic magnet is fixed to the slider via the back yoke.

3. A linear conveyer comprising:

a stationary module including:

a frame extending linearly;

a stator including armature coils and fixed to the frame; and a rail fixed to the frame;

a magnetic sensor, and a slider movable along the rail by a linear motor, the slider including:

a mover including magnetic poles;

a rail guide fitted on the rail; and a magnetic scale including:

a plastic magnet having magnetic poles and extending along an extending direction in which the rail extends; and a back yoke on which the plastic magnet is placed, wherein a position of the slider is detected by the magnetic sensor and the magnetic scale, the plastic magnet has a fixed portion that is fixed with respect to the back yoke and a portion other than the fixed portion, the portion other than the fixed portion being movable relative to the back yoke along an extending direction in which the magnetic scale extends, the magnetic scale further includes a band member made of resin, and the band member holds the back yoke and the plastic magnet collectively as an integral component, and the band member is fixed to the plastic magnet so as not to be movable relative to the plastic magnet and so as to be movable relative to the back yoke along the extending direction of the magnetic scale.

4. The linear conveyer according to claim 3, wherein the plastic magnet includes the fixed portion in a middle portion in the extending direction of the magnetic scale.

5. The linear conveyer according to claim 3, wherein the slider includes a positioning portion with which an object is positioned on the slider, and the fixed portion of the magnetic scale is located to correspond to the positioning portion.

6. The linear conveyer according to claim 3, wherein the back yoke has a recess on a portion thereof corresponding to the fixed portion of the plastic magnet, the band member has a projection portion on a portion thereof corresponding to the recess of the back yoke, and the recess and the projection portion are fitted to each other.

7. The linear conveyer according to claim 6, wherein the projection portion of the band member is molded with insert molding using resin.

8. The linear conveyer according to claim 3, wherein the plastic magnet has projections at intervals, and the band member includes band members each of which wraps a corresponding one of the projections.

9. A slider for a linear conveyer comprising:

an upper plate portion;

a side plate portion:

a mover including magnetic poles and mounted to the upper plate portion;

a rail guide mounted to the upper plate portion and configured to be fitted to a rail included in a stationary module; and a magnetic scale mounted to the side plate portion, the magnetic scale including:

a plastic magnet extending along an extending direction in which the rail guide extends and having magnetic poles; and a back yoke on which the plastic magnet is placed, wherein the plastic magnet has a fixed portion that is fixed to the back yoke and a portion other than the fixed portion, the portion other than the fixed portion being movable relative to the back yoke along an extending direction in which the magnetic scale extends, the plastic magnet includes the fixed portion in a middle portion in the extending direction of the magnetic scale, the magnetic scale further includes a holding member holding the back yoke and the plastic magnet, the holding member is not movable with respect to the plastic magnet and the back yoke at the fixed portion, and the holding member is not movable with respect to the plastic magnet and is movable with respect to the back yoke in the portion other than the fixed portion.

10. The slider according to claim 9, wherein the back yoke includes a mounting portion that is mounted to and fixed to the slider, and the plastic magnet is fixed to the slider via the back yoke.

11. A slider for a linear conveyer comprising:

an upper plate portion;

a side plate portion:

a mover including magnetic poles and mounted to the upper plate portion;

a rail guide mounted to the upper plate portion and configured to be fitted to a rail included in a stationary module; and a magnetic scale mounted to the side plate portion, the magnetic scale including:

a plastic magnet extending along an extending direction in which the rail guide extends and having magnetic poles; and a back yoke on which the plastic magnet is placed, wherein the plastic magnet has a fixed portion that is fixed to the back yoke and a portion other than the fixed portion, the portion other than the fixed portion being movable relative to the back yoke along an extending direction in which the magnetic scale extends, the magnetic scale further includes a band member made of resin, and the band member holds the back yoke and the plastic magnet collectively as an integral component, and the band member is fixed to the plastic magnet so as not to be movable relative to the plastic magnet and so as to be movable relative to the back yoke along the extending direction of the magnetic scale.

12. The slider according to claim 9, wherein
the plastic magnet has projections that are provided at intervals, and
the holding member includes band members each of which is made of resin and holds the back yoke and the plastic magnet with wrapping a corresponding one of the projections.

13. The slider according to claim 11, wherein
the back yoke has a recess on a portion thereof corresponding to the fixed portion of the plastic magnet,
the band member has a projection portion on a portion thereof corresponding to the recess of the back yoke, and
the recess and the projection portion are fitted to each other.

14. The linear conveyer according to claim 1, wherein
the plastic magnet has an elongated plate shape having elongated plate surfaces and elongated side surfaces,
the back yoke has an elongated plate shape including a first plate surface on which the plastic magnet is placed, a second plate surface, and elongated side surfaces, and
the holding member extends from the elongated side surfaces of the back yoke to the elongated side surfaces of the plastic magnet, respectively.

15. The linear conveyer according to claim 14, wherein
the holding member extends from the second plate surface to each of the elongated side surfaces of the plastic magnet.

16. The slider according to claim 9, wherein
the plastic magnet has an elongated plate shape having elongated plate surfaces and elongated side surfaces,
the back yoke has an elongated plate shape including a first plate surface on which the plastic magnet is placed, a second plate surface, and elongated side surfaces, and
the holding member extends from the elongated side surfaces of the back yoke to the elongated side surfaces of the plastic magnet, respectively.

17. The slider according to claim 16, wherein the holding member extends from the second plate surface to each of the elongated side surfaces of the plastic magnet.

* * * * *